(12) United States Patent
Kashio

(10) Patent No.: US 7,009,650 B2
(45) Date of Patent: Mar. 7, 2006

(54) DATA COMMUNICATIONS DEVICE, DATA COMMUNICATIONS SYSTEM, DOCUMENT DISPLAY METHOD WITH VIDEO AND DOCUMENT DISPLAY PROGRAM WITH VIDEO

(75) Inventor: Yukio Kashio, Tokyo (JP)

(73) Assignee: Casio Computer Co., Ltd., (JP)

( * ) Notice: Subject to any disclaimer, the term of this patent is extended or adjusted under 35 U.S.C. 154(b) by 43 days.

(21) Appl. No.: 10/642,134

(22) Filed: Aug. 18, 2003

(65) Prior Publication Data

US 2004/0036700 A1 Feb. 26, 2004

(30) Foreign Application Priority Data

Aug. 20, 2002 (JP) .............................. 2002-239021

(51) Int. Cl.
*H04N 5/222* (2006.01)
(52) U.S. Cl. ................. 348/333.01; 348/207; 348/375; 345/660
(58) Field of Classification Search ................. 725/62; 348/333.01, 333.11, 376, 14.03–14.07, 14.12–14.13, 348/586, 596, 441, 459, 581, 552, 276, 275, 348/207; 455/556; 345/660
See application file for complete search history.

(56) References Cited

U.S. PATENT DOCUMENTS

| 5,331,351 | A | * | 7/1994 | Haas ........................... 348/558 |
| 6,745,024 | B1 | * | 6/2004 | DeJaco et al. .............. 709/206 |
| 6,763,226 | B1 | * | 7/2004 | McZeal, Jr. ................. 455/90.2 |
| 2002/0072395 | A1 | * | 6/2002 | Miramontes ................ 455/566 |

FOREIGN PATENT DOCUMENTS

| JP | 11-317892 | | 11/1999 |
| JP | 11317892 A | * | 11/1999 |
| JP | 2000-23121 | | 1/2000 |
| JP | 2000023121 A | * | 1/2000 |
| JP | 2000-132152 | | 5/2000 |
| JP | 2000-215298 | | 8/2000 |
| JP | 2000-270294 | | 9/2000 |
| JP | 2000270294 A | * | 9/2000 |
| JP | 2002-141990 | | 5/2002 |
| JP | 2002-156961 | | 5/2002 |

OTHER PUBLICATIONS

State Intellectual Property Office of People's Republic of China, The First Office Action, issued Jun. 10, 2005 (Chinese and English Translation).

* cited by examiner

*Primary Examiner*—Thai Tran
*Assistant Examiner*—Gary C. Vieaux
(74) *Attorney, Agent, or Firm*—Blank Rome LLP

(57) ABSTRACT

In cases when cellular phone 1*a* plays back a 96×80 pixel video while creating an E-mail with a video attachment or receiving an E-mail with a video attachment, the data communications device enlarges the video periphery and performs playback in 128×96 pixels. Even though the expansion method employed simply enlarges the video periphery, enlarges the scale factor ratio linearly from the center section extending to the periphery and enlarges the scale factor ratio exponentially from the video center section extending to the periphery, a reduction in video visibility by expansion is prevented as the center section is set to 1× (one fold). Consequently, in video playback the common problem of decreased visibility from image deterioration does not occur, resulting in the display area being utilized effectively with enhanced visual effects and image quality.

3 Claims, 26 Drawing Sheets

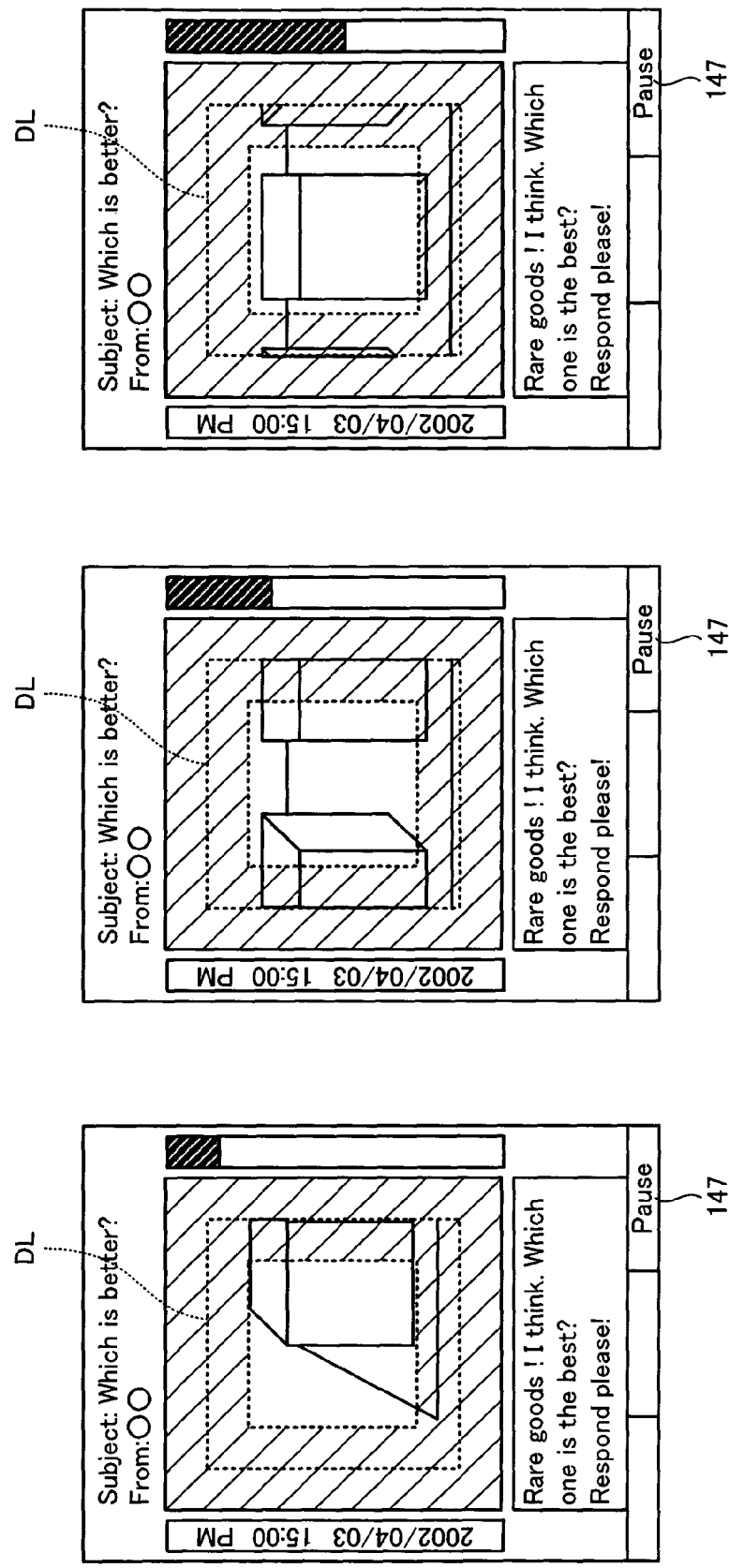

DATA COMMUNICATIONS DEVICE, DATA COMMUNICATIONS SYSTEM, DOCUMENT DISPLAY METHOD WITH VIDEO AND DOCUMENT DISPLAY PROGRAM WITH VIDEO

BACKGROUND OF THE INVENTION

The present invention relates to a data communications device as applied to an electronic mail (hereinafter referred to as E-mail) system and the like, a data communications system, a document display method with video and a document display program with video.

A system which exchanges E-mail with various files attached is now universally known technology. In recent years, subscriber's wireless communications terminals, such as a cellular phone (also commonly known as a mobile phone), have been equipped with an image pick-up function. Also, digitized images (or images stored at a URL address of a homepage file, image file or any other file supported by the Internet HTTP or FTP protocols) can be attached to an E-mail and transmitted to another user's destination via a wireless communications terminal. The E-mail text and images can be displayed on the user's wireless communications terminal. Moreover, E-mail services have emerged for not only sending and receiving still pictures, but also the technology for including small capacity video images as E-mail attachments. For example, Japanese Laid-Open Patent Application (Kokai) (A) No. 2000-023121 titled "DEVICE AND METHOD FOR PICTURE COMMUNICATIONS AND STORAGE MEDIUM." The technology to append written information to a video image is also known, as disclosed in Japanese Laid-Open Patent Application (Kokai) (A) No. H11-317892 (1999) titled "DIGITAL CAMERA."

For example, cellular phones can display still pictures in 128×96 pixels. However, video images are limited to a smaller screen size of 96×80 pixels. Consequently, although a 128×96-pixel display area is provided, the playback size of video images is significantly reduced and not effectively using the full display area. This problem has been partly addressed by using the idea of just taking the 96×80 pixel video and simply enlarging the size to 128×96 pixels for playback as disclosed in Japanese Laid-Open Patent Application (Kokai) (A) No. 2000-270294 titled "DIGITAL CAMERA AND METHOD FOR PROCESSING IMAGE DATA."

However, based on the conventional technology of simply expanding the 96×80 pixel video images to playback in the size of 128×96 pixels, the main disadvantage is the video images are coarse and often blurry, thereby making them difficult to see. In comparison, the present invention introduces a novel approach to produce extremely clear multimedia video images. Without causing degradation of the visibility by image deterioration in video playback, the display area can be used more effectively to obtain the benefit of markedly improved image quality and enhanced visual effects.

SUMMARY OF THE INVENTION

The present invention has been made in view of the circumstances mentioned above. Accordingly, the purpose of the present invention is to provide a data communications device which utilizes the display area effectively during video playback by enhancing the visual effects and image quality without causing decreased visibility through image deterioration; a data communications system; a document display method with video; and a document display program with video.

To achieve the above-described objects and in accordance with the present invention, the data communications device comprises a storage means for storing video by which data communications is performed; a display means for displaying at least the video stored in the storage means; and a display control means for controlling the display means to read out video stored in the storage means, to enlarge the video periphery, and to perform video playback in the display practicable area size of the display means.

In accordance with the present invention, the terminology "video" per se should not be inferred to mean or be limited to video typically related only to televised images, videotape recordings, DVD playback and the like. "Video" is the overall concept used to describe moving visual images versus still pictures. Therefore, the field of invention technical term "video" in this invention comprises all types of color or black and white video and their varied worldwide references, such as animation, motion pictures, motion images, motion video, television and the like. Furthermore, these types of video can be live or recorded in movie clips, movie files, video clips, video files or the like.

According to the data communications device of this invention, further comprises an expansion judgment means for judging whether the video is enlarged or not by identifying expansion direction information appended to the video; wherein when judged the expansion direction information is directing expansion by the expansion judgment means, the display control means controls the display means, to enlarge the video periphery and, to perform video playback in the display practicable area size of the display means.

Additionally, the data communications device according to the present invention, further comprises an expansion direction means for directing expansion of the video at the time of video playback, wherein when the expansion direction means directs expansion of the video, the display control means controls the display means, to enlarge the video periphery, and to perform video playback in the display practicable area size of the display means.

According to the data communications device of this invention, wherein the display control means controls the display means to simply enlarge the video periphery and performs video playback.

According to the data communications device of this invention, wherein the display control means controls the display means to enlarge the scale factor ratio linearly from the center section extending to the periphery and to perform video playback.

According to the data communication device of this invention, wherein the display control means controls the display means to enlarge the scale factor ratio exponentially from the center section extending to the periphery and to perform video playback.

The data communications system of this invention comprises a data transmitting device and a data receiving device, the data transmitting device further comprises a display means for displaying video; a video storage means for storing video; a first display control means for controlling the display means to read out video from the storage means to enlarge the video periphery and to perform video playback in the display practicable area size of the display means; a transmitting means for performing wireless transmission of the video. The data receiving device further comprises the display means for displaying video; a receiving means for receiving video transmitted from the data transmitting device; a storage means for storing the video received by the receiving means; and a second display control means for controlling the display means to read out video from the storage means, to enlarge the video periphery, and to perform video playback in the display practicable area size of the display means.

In addition, according to the data communications system of this invention, the data transmitting device further comprises an image pick-up means for recording images; the video storage means stores the images digitized by the image pick-up means.

The E-mail document display method with a video attachment of this invention comprising the steps of displaying video associated with an E-mail document at least on a display performed in a communications facility which performs data communications of the video by way of wireless signals; reading out stored video in memory; enlarging the video periphery; and performing to the display video playback in a display practicable area size of the display.

Additionally, the E-mail document display method with a video attachment further comprising the steps of identifying expansion direction information appended to the video attachment; enlarging the video attachment periphery where the expansion direction information is judged indicating expansion; and performing to the display video playback in a display practicable area size of the display.

Also, the E-mail document display method with a video attachment, wherein in cases when enlarging the video during playback is directed, the enlarging step enlarges the video periphery, and the performing step performs video playback in the display practicable area size of the display.

In accordance with the present invention, the E-mail document display method with a video attachment simply enlarges the video periphery and performs video playback.

In accordance with the present invention, the E-mail document display method with a video attachment further includes the steps of enlarging the scale factor ratio linearly from the center section extending to the periphery and performing video playback.

In accordance with the present invention, the E-mail document display method with a video attachment, the E-mail document display method further includes the steps of enlarging the scale factor ratio exponentially from the center section extending to the periphery and performing video playback.

The E-mail document display program with a video attachment for displaying the video associated with an E-mail document at least on a display performed in a communications facility which performs data communications of the video with wireless signals. The E-mail document display program with a video attachment includes a playback step; the playback step for reading out the video attachment stored in memory, for enlarging the video periphery, and for performing video playback in the display practicable area size of the display.

Additionally, the E-mail document display program with a video attachment, wherein the E-mail document display program further comprises an expansion judgment step. The judgment step identifies expansion direction information appended to the video attachment and judges whether the video attachment is enlarged, wherein when judged the expansion direction information is directing expansion by the expansion judgment step. The playback step controls the display to enlarge the video periphery and to perform video playback in the display practicable area size of the display.

In addition, the E-mail document display program with a video attachment in this invention further comprises an expansion direction step for directing expansion of the video at the time of video playback, wherein when the direction step directs expansion of the video. The playback step controls the display to enlarge the video periphery and to perform video playback in the display practicable area size of the display.

Also, the E-mail document display program with a video attachment, wherein the playback step simply enlarges the video periphery and performs video playback.

Furthermore, the E-mail document display program with a video attachment according to this invention, wherein the playback step enlarges the scale factor ratio linearly from the center section extending to the periphery and performs video playback.

Lastly, the E-mail document display program with a video attachment according to this invention, wherein the playback step enlarges the scale factor ratio exponentially from the video center section extending to the periphery and performs video playback.

The data communications device equipped with still picture display capabilities and video display capabilities according to this invention comprises a display for displaying video and still pictures, in that the size (vertical× horizontal; V1×H1) of the video is smaller (V1<V2, H1<H2) than the size (V2×H2) of still pictures; and an expansion means for enlarging the video to the display size (V2×H2) of still pictures. The expansion means further comprises an expansion control means, the expansion control means divides one video screen into a center section (V3×H3; V3<V1, H3<H1) and its periphery, and enlarges only the periphery of the video screen.

Additionally, the data communications device according to this invention, wherein the expansion control means controls the scale factor ratio to enlarge magnification, so that V1 and H1 are approached to make the scale factor ratio small and so that V3 and H3 are approached to enlarge the scale factor ratio to match the video periphery section.

Furthermore, the data communications device according to this invention further comprises an E-mail transceiver capability; the E-mail transceiver capability includes an E-mail control means. The E-mail control means transmits the video attachment by E-mail.

In accordance with the present invention, a cellular phone with a digital camera is provided. The cellular phone with a digital camera comprises a memory for storing video received by E-mail attachment; a display device for displaying still pictures and video; and a display controller for controlling the display device to read out received video stored by the memory, to enlarge the video periphery, and to perform video playback in the still picture display practicable area size of the display device.

According to the present invention, the cellular phone with a digital camera comprises a shutter; a still picture image pick-up means for recording still pictures when the shutter is operated less than predetermined time; a video image pick-up means for recording video when the shutter is operated more than predetermined time; a storage means for storing the recorded still pictures or video; an E-mail transceiver means for transmitting the still pictures or video stored in the storage means by E-mail attachment, and for receiving still pictures or video by E-mail attachment; a still picture display means for displaying still pictures stored in the storage means; and a video display means for displaying video stored in the storage means, wherein the video display means enlarges the periphery of video and performs video playback in the display size of a still picture.

In accordance with the present invention, the data communications device comprises a receiving means for receiving still pictures and video; an image pick-up means for recording still pictures and video; a storage means for storing the still pictures and video recorded by the image pick-up means, or the still pictures or video received by the receiving means; a display means for displaying still pictures or video stored in the storage means; a video playback means for selecting video stored in the storage means, for enlarging the video periphery of the selected video and for performing continuous playback in the display size of the still picture; a pause direction means for directing to suspend playback of the video; and a display control means for controlling the display means to suspend playback of the video, to enlarge a still picture at that instant uniformly, and to display on the display means when there are pause directions from the pause direction means.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 24 is a mimetic diagram showing an example of the display screen while playing back the video of a received E-mail with a video attachment.

DETAILED DESCRIPTION OF THE INVENTION

The present invention will hereinafter be described in detail with reference to the preferred embodiments shown in the accompanying drawings as applied to a cellular phone. A cellular phone is synonymous with a mobile phone or cellular mobile, which is the type of wireless communications most familiar to mobile phone users. This kind of telephone is called "cellular" because the system uses many base stations to divide a service area into multiple "cells." Cellular calls are transferred from base station to base station as a user travels from cell to cell. Also, a cellular phone is not to be confused with a cordless telephone, which is simply a phone with a very short wireless connection to a local phone outlet (i.e. a regular home/work telephone with a short range cordless extension).

A-1 Composition of the Embodiment

Figure 1:
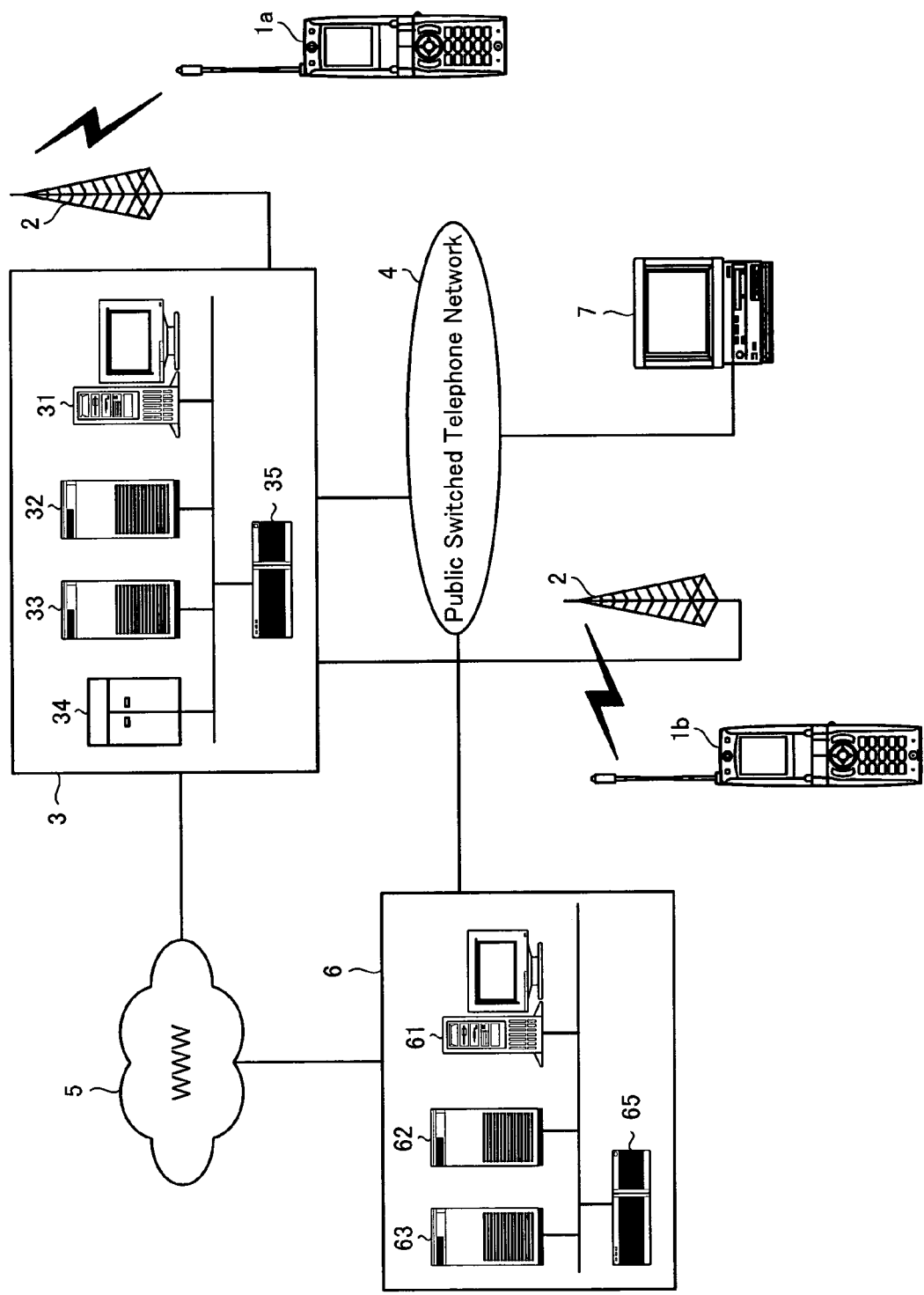
FIG. 1 is a block diagram showing an E-mail transceiver structure of a system according to the embodiment of this invention.

FIG. 1 is a block diagram illustrating the composition of an E-mail transceiver system according to the embodiments of this invention. In the drawing, cellular phones 1*a* and 1*b* (a wireless communications terminal/data communications device) are equipped with an image pick-up function and an image memory. Additionally, the cellular phones 1*a* and 1*b* are capable of transmitting video stored in the image memory to a system (Notably, E-mail servers 33 and 63 described below) and the capability to receive E-mail with video attachments. When creating an E-mail with video on the cellular phones 1*a* and 1*b*, both the E-mail text and the E-mail video attachment can be displayed on one screen. Similarly, when E-mail with video is received, both the E-mail text and video playback can be viewed on one screen. In this example, the E-mail text and the video attachment can also be displayed on a separate screen. Furthermore, at the time of video playback, the video is expanded to the 128×96 pixel maximum display area. Even though the expansion method employed simply enlarges the video periphery, enlarges the scale factor ratio linearly from the center section extending to the periphery and enlarges the scale factor ratio exponentially from the video center section extending to the periphery, a reduction in video visibility by expansion is prevented as the center section is set to 1× (one fold). As the video expansion algorithm used is well-known technology, a detailed explanation has been omitted.

A wireless base station 2 is connected to a Communication Service Provider 3 (hereinafter referred to as CSP), which includes an Internet Service Provider (hereinafter referred to as ISP). The subscriber of the cellular phones 1a and 1b accesses these services via a Public Switched Telephone Network 4 (hereinafter referred to as PSTN).

The CSP 3, with the ISP included, provides the system (web server 32, router 35) for access to a below-mentioned World Wide Web 5 (hereinafter referred to as WWW 5), as well as a switchboard 34 needed for the cellular phone service supplied as the main service and an E-mail system, the E-mail server 33. The wireless base station 2 also provides the Access Point (AP) for connecting cellular phones 1a and 1b to the WWW 5.

The PSTN 4 is an analog and digital telephone circuit network. WWW 5 is the also universally known as the Internet.

Except for a switchboard, the ISP 6 is of the same composition as the CSP 3, and provides the system (for convenience web server 62 and router 65). A personal computer 7 by way of the PSTN 4 and the ISP 6 connects to the WWW 5 or acquires the capability to transmit and receive E-mail documents (synonymous with E-mail messages).

In addition, as a characteristic feature of this embodiment, although an E-mail with video between the cellular phones 1a and 1b can display the E-mail text and video on one screen (described later in detail), E-mail with video sent from the cellular phones 1a and 1b to the personal computer 7 is treated as an attached file. Accordingly, the "E-mail software program with video" according to this embodiment has E-mail software compatibility which is universally known.

Figure 2A:
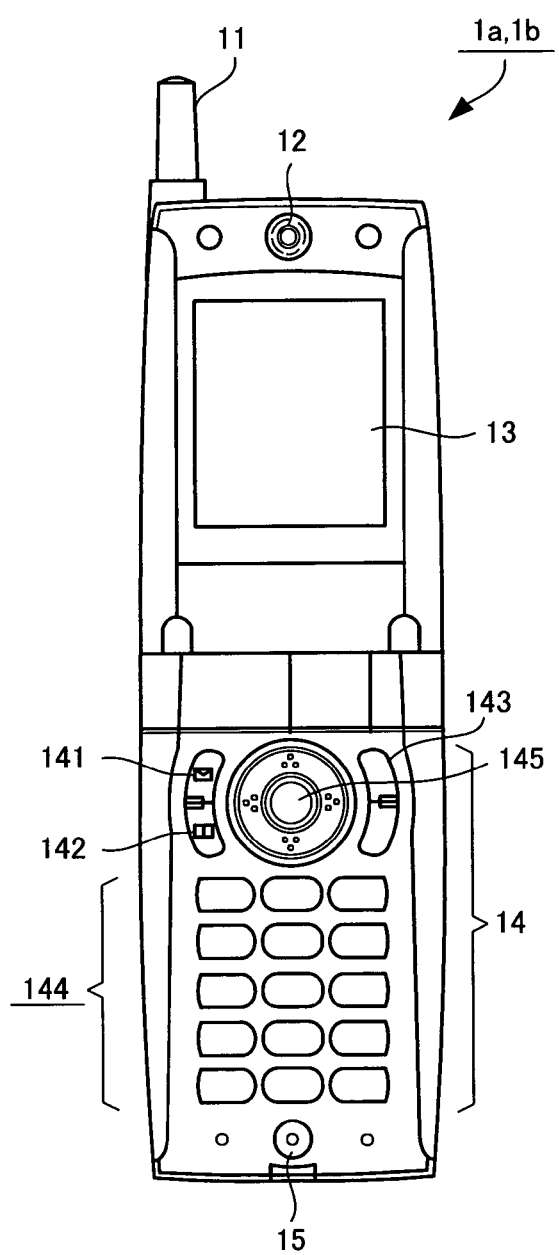
FIG. 2 is an external view (open state: front view and rear view) of the cellular phones 1*a* and 1*b*.
Figure 2B:
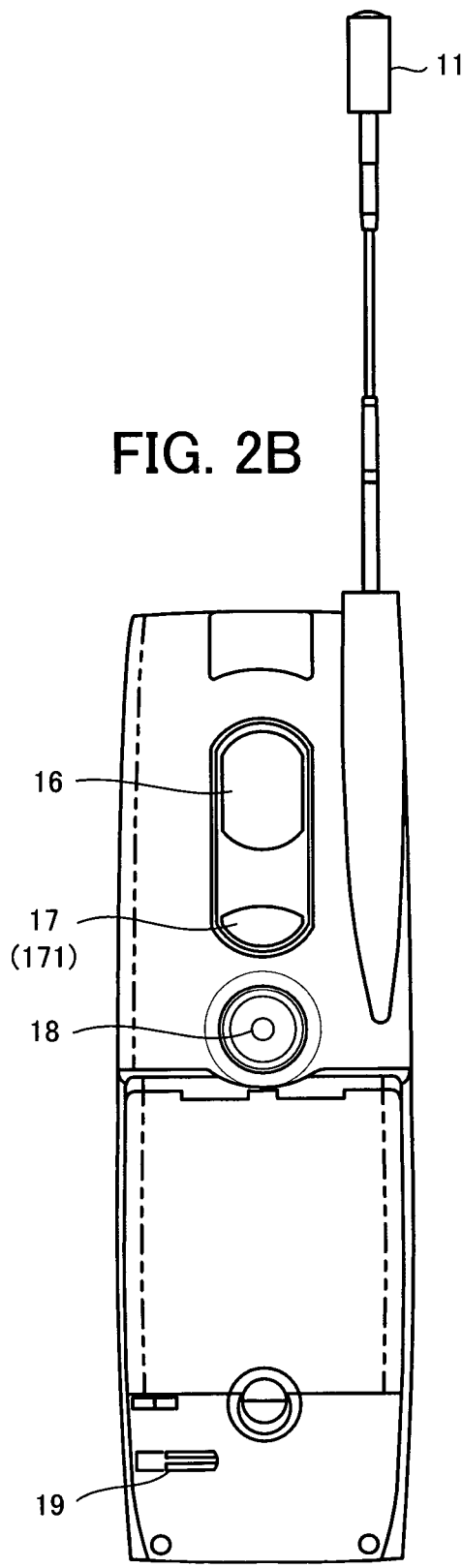

Next, FIGS. 2A and 2B are the external views (in open state: front view and back view) of the cellular phones 1a and 1b. The cellular phones 1a and 1b in this embodiment are a clamshell-like flip design which fold in half and consist of a lid section and a main body section. A wireless antenna element 11 is located on the back of the lid section and is made of an elastic material. A speaker 12 is situated on the upper front side of the lid section and performs audio output as the earpiece. A main display 13 is comprised of a color Liquid Crystal Display (LCD) with 120 dots in width×160 dots in height. Pictures (also called snapshots) and E-mail text with pictures can be simultaneously viewed on the main display 13.

A keystroke section 14 is formed on the front side of the main body section and contains the various function keys (an E-mail key 141, an address key 142, a function key 143), a keypad 144, a shutter key 145 (also commonly referred to as a shutter button or a center key). The E-mail key 141 is for activating the E-mail function and displaying the E-mail menu. The address key 142 is for opening the address book, which is principally used to select or store a recipient's E-mail address. The function key 143 is used for operating the video "Playback" or "Pause" (temporarily suspend) when creating (originating) an outgoing E-mail message with a video attachment (commonly referred to as a video clip or movie clip attachment) or when viewing an incoming E-mail message with a video attachment (also known as movie E-mail or video messaging). The keypad 144 is employed for inputting telephone numbers, alphanumeric characters and the like. When the shutter key 145 is pressed down for more than a predetermined number of seconds (about two seconds or more), the image pick-up mode detects this condition and begins a video recording (also known as shooting a movie).

A microphone 15 is situated in the lower front side of the main part section and performs audio input as the mouthpiece. The recorded data is momentarily stored in an image pick-up data buffer area 297 until the video recording is either completed or the data exceeds the allotted storage capacity (a maximum of 100K bytes). Subsequently once the stored up data reaches the storage capacity or the circuitry detects the above-mentioned shutter key 145 is released, the data is processed into a compressed file and transferred into an image memory 23 for subsequent retrieval.

A sub-display 16 is formed in the back of the lid section. A back key 17 comprised of a transparent or translucent component, with a built-in Light Emitting Diode (LED) 171, emits light upon receiving an incoming E-mail. An image pick-up lens 18 is formed on the back of the lid section and directly below the lower part of the above-mentioned sub-display 16. Additionally, an information speaker 19 announces the arrival of E-mail etc., and located on the back of the main body section so that the informational sound can be heard, even when the lid section and the main body section are closed in a folded state.

Figure 3:
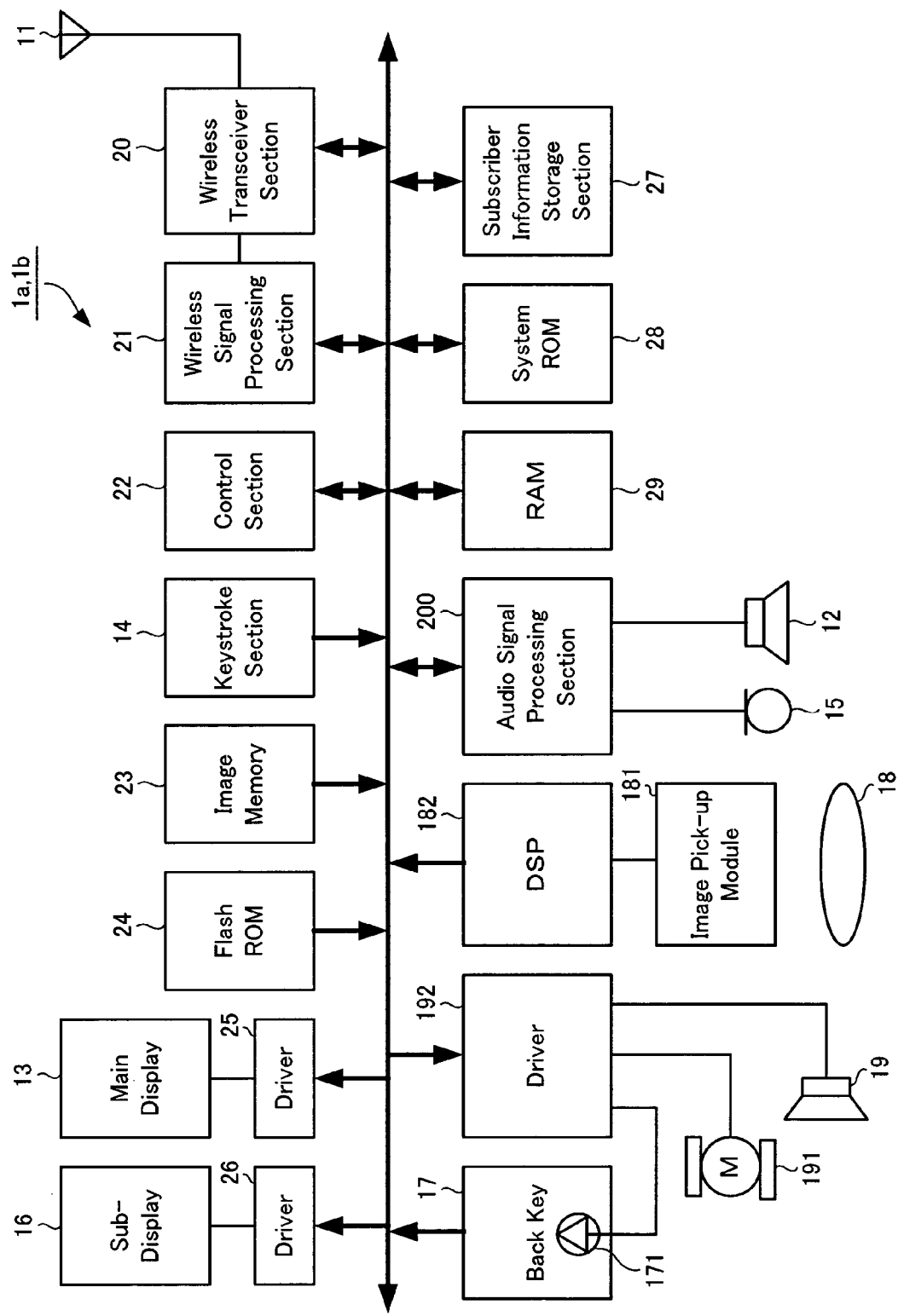
FIG. 3 is a block diagram showing the composition of the cellular phones 1*a* and 1*b*.

Subsequently, FIG. 3 is a block diagram showing the composition of the cellular phones 1a and 1b. Attached to the wireless antenna element 11, a wireless transceiver section 20 serves as the component through which modulated/demodulated sound and data (E-mail data) are sent and received. A wireless signal processing section 21 performs the required processing for wireless communications by demodulating the sound and data (E-mail) received from the wireless transceiver section 20, as well as modulates the sound and data for transmitting to the wireless transceiver section 20. A control section 22 controls the various functions of the entire operation.

The image memory 23 is the memory for storing images digitized by an image pick-up section (the image pick-up lens 18, an image pick-up module 181 and a Digital Signal Processor (DSP) 182 and for image files downloaded via the WWW 5. The image file compression coding is performed by a program stored in an image processing program area 2413. A Read-Only Memory (ROM) 24 comprises rewritable Flash ROM containing various below-mentioned programs used as a characteristic feature of this invention.

A driver 25 functions as the driver for the main display 13. A driver 26 functions as the driver for the sub-display 16. A subscriber information storage section 27 stores profile data, such as the telephone number for calling this cellular phone 1 and the subscriber's (user's) identification (ID). A system ROM 28 stores the various programs which control a control section 22. Random Access Memory (RAM) 29 memorizes the various kinds of data required as a wireless communications terminal, stores essential data when the control section 22 operates and retains E-mail data in memory storage. Particularly in this embodiment, while in the photography mode, the RAM 29 functions as the storage area for buffering video images during recording.

An audio signal processing section 200 performs the encoding process of the audio signal input from the microphone 15, or based on the signal output from the wireless signal processing section 21 decodes the signal and drives the speaker 12 to output the audio. The image pick-up module 181 comprises an analog Charged Coupled Device (CCD) or Complementary Metal Oxide Semiconductor (CMOS) to capture (shoot) color images. The DSP 182 performs digital the encoding process of the image captured by the image pick-up module 181. A driver 192 is the information device driver for activating the information speaker 19, a vibrator 191 and the LED 171.)

Figure 4:
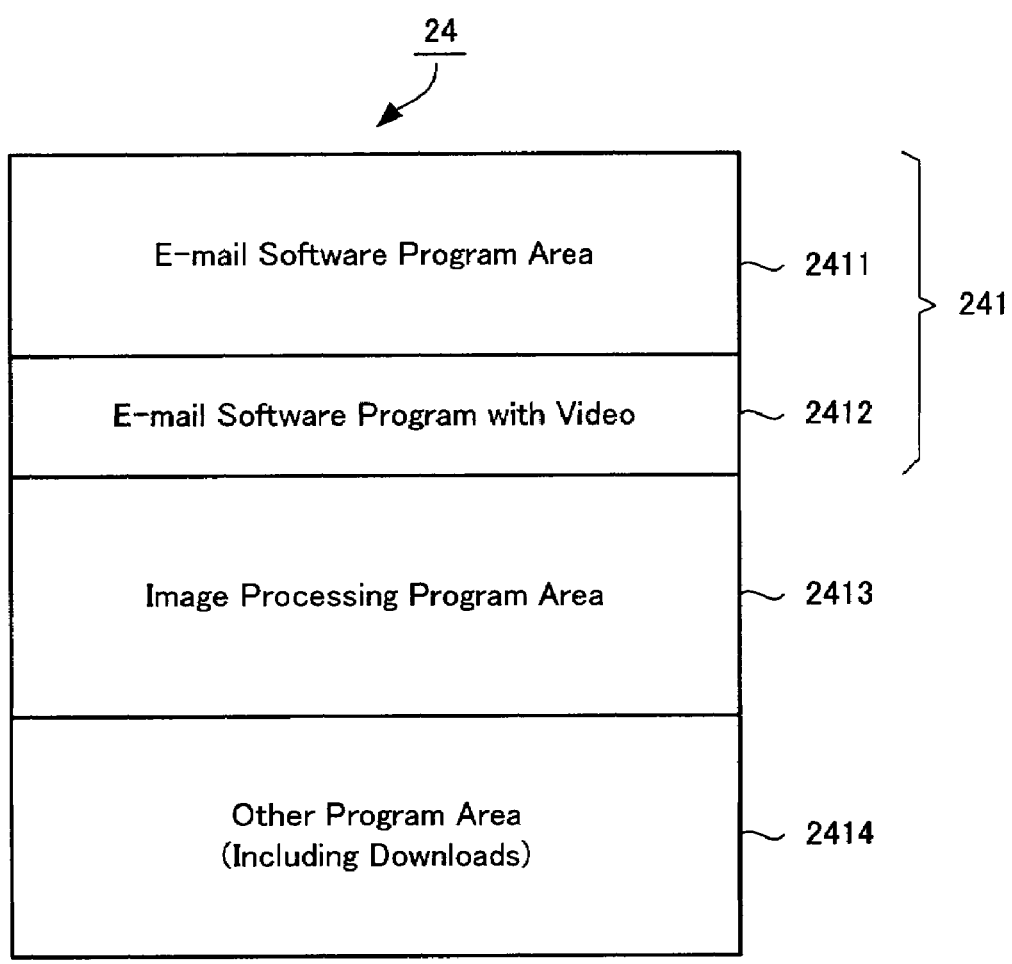
FIG. 4 is a conceptual diagram showing the composition of the ROM 24 memory area of the cellular phones 1*a* and 1*b*.

Next, FIG. 4 is a conceptual diagram of the cellular phones 1a and 1b showing the composition of the ROM 24 memory area. The ROM 24 contains a software program which is a characteristic feature of this embodiment. The ROM 24 comprises an E-mail software program area 241, the image processing program area 2413, and an other program area 2414 which includes downloads.

The E-mail software program area 241 is divided into an area 2411 which contains an established well-known E-mail software program, and an area 2412 which stores an E-mail software program with video. In addition, a subscriber can download an E-mail software program with video from the WWW 5 via the ISP 6.

The image processing program area 2413 contains the image processing program for creating a compressed file from the video data. In particular, the video data recorded (picked-up) and digitized in the image pick-up section (the image pick-up lens 18, the image pick-up module 181 and the DSP 182) and buffered in the RAM 29 is processed using the codec compression method based on the international standard Moving Picture Experts Group-4 (MPEG-4) technology. Additionally, this image processing program enlarges the video periphery and converts the entire display size into an interpolated resolution of 128×96 pixels, during playback of filed video images received from external sources or images taken by the user.

Figure 5:
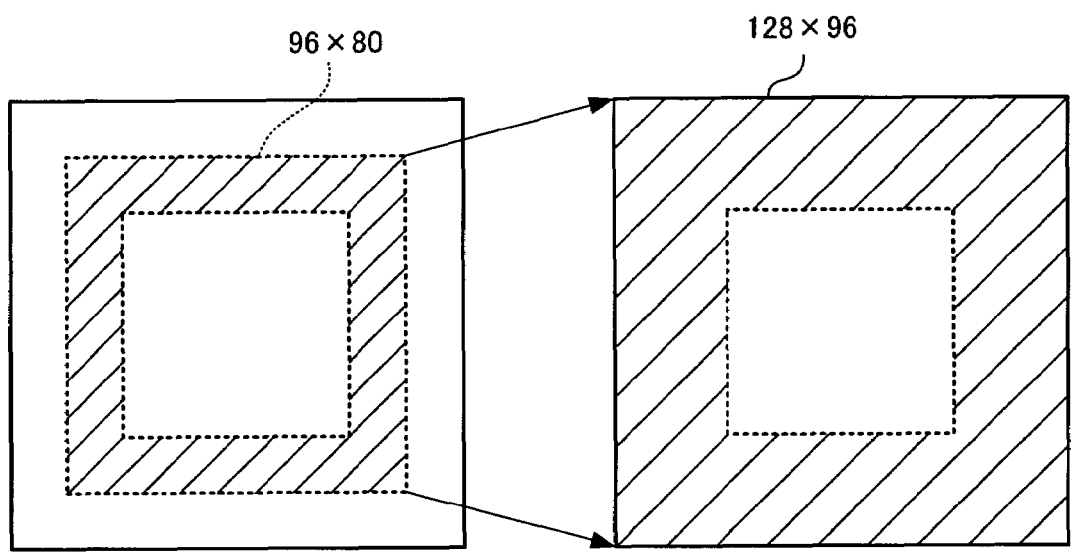
FIG. 5 is a conceptual diagram for explaining the video expansion method according to this embodiment.

Here, FIG. 5 is a conceptual diagram for explaining the video scale expansion method as applied to this embodiment. As mentioned above in this embodiment the 96×80 pixel video periphery (diagonally marked area in the diagram), based on a predetermined video scale expansion method (described below), accordingly performs an expanded time-base sweep (also known as zoom in relation to scale expansion/contraction) to playback in the entire 128×96 pixel display area. Moreover, when the video is paused (temporarily suspended), this method also performs uniform scale expansion to display still images entirely in 128×96 pixel Sub-Quarter Common Intermediate Format (Sub-QCIF) size. The other program area 2414 stores application programs other than the above.

Figure 6A:
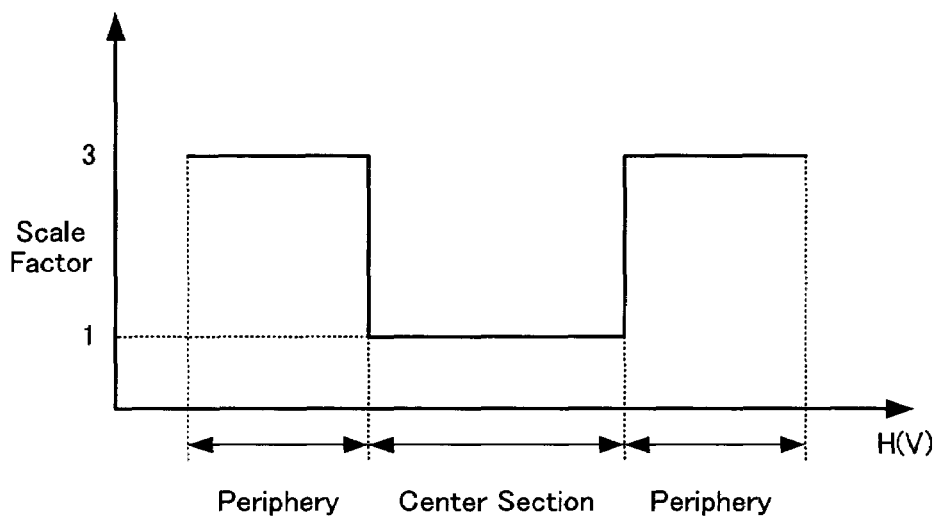
FIG. 6 is a conceptual diagram for explaining an example of the video expansion method according to this embodiment.
Figure 6B:
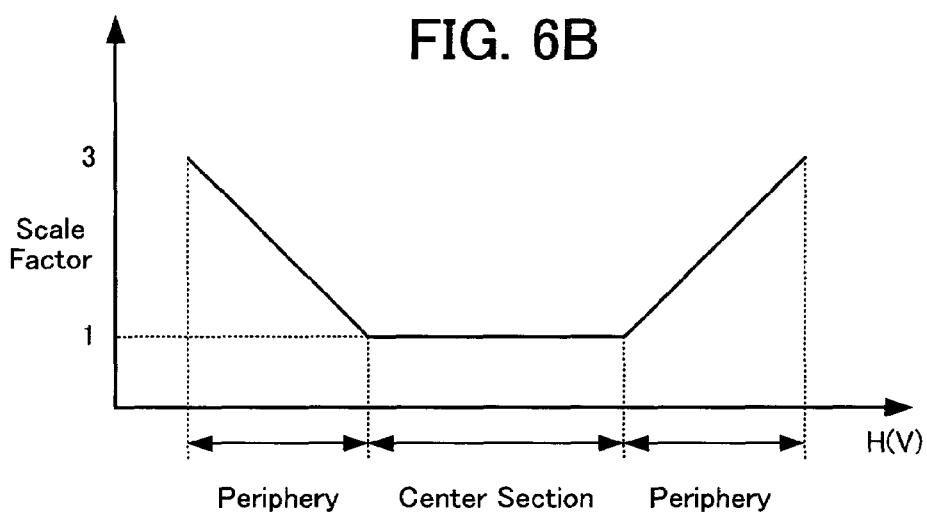
Figure 6C:
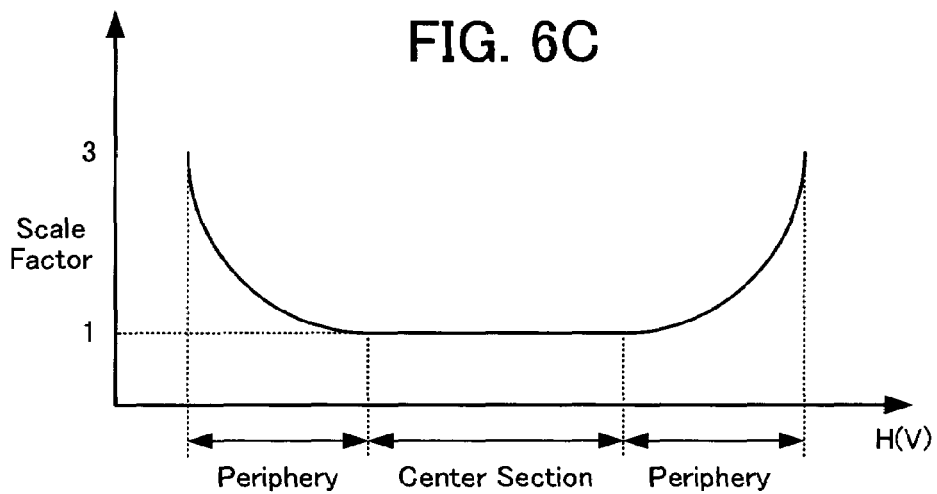

Next, FIG. 6 is a conceptual diagram for explaining an example of the video scale expansion method according to this embodiment. FIG. 6A illustrates the method whereby the center section is set to scale=1× (one fold) and simply enlarges the periphery to scale=3× (threefold). FIG. 6B illustrates the method which enlarges the scale factor ratio (also referred to a dilation ratio) linearly extending the video to the periphery. FIG. 6C illustrates the method which enlarges the scale factor ratio exponentially from the center section extending to the periphery. In this case example, to prevent a reduction in the visibility due to the video expansion, the center section remains set to scale=1×. Furthermore, the particular video scale expansion method to be applied can be determined beforehand as a convenient user-selectable setting option.

Figure 7:
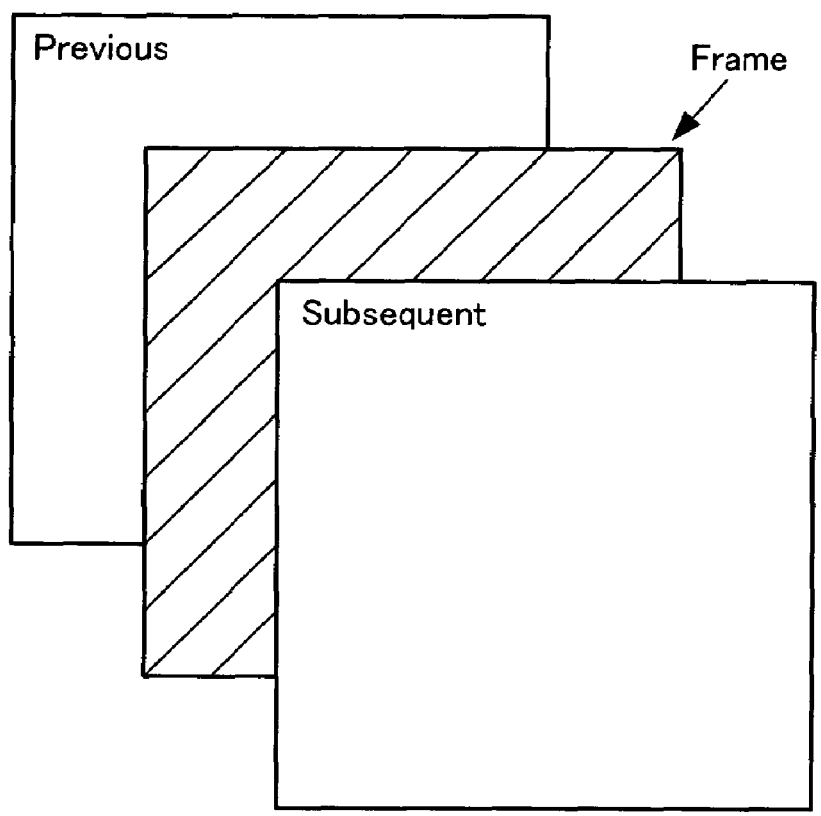
FIG. 7 is a conceptual diagram for explaining an example of the method of video expansion according to this embodiment.
Figure 8:
FIG. 8 is a conceptual diagram for explaining an example of the method of the video expansion according to this embodiment.

Next, FIGS. 7 and 8 are conceptual diagrams for explaining an example of the video expansion method. As shown in FIG. 7, as it is necessary to refer to the frame order in cases where the video to be decoded (using decompression codec) is MPEG-4, a memory area for three reference frames is ordinarily required in the buffer. Also, referring only to the details necessary to explain this example, as shown in FIG. 8, pixel interpolation is achieved by embedding the data of the primary observed pixel into adjacent pixel areas as the method of expanded time-base sweep. Usually, additional filter processing is applied to the interpolated data called image processing.

Figure 9:
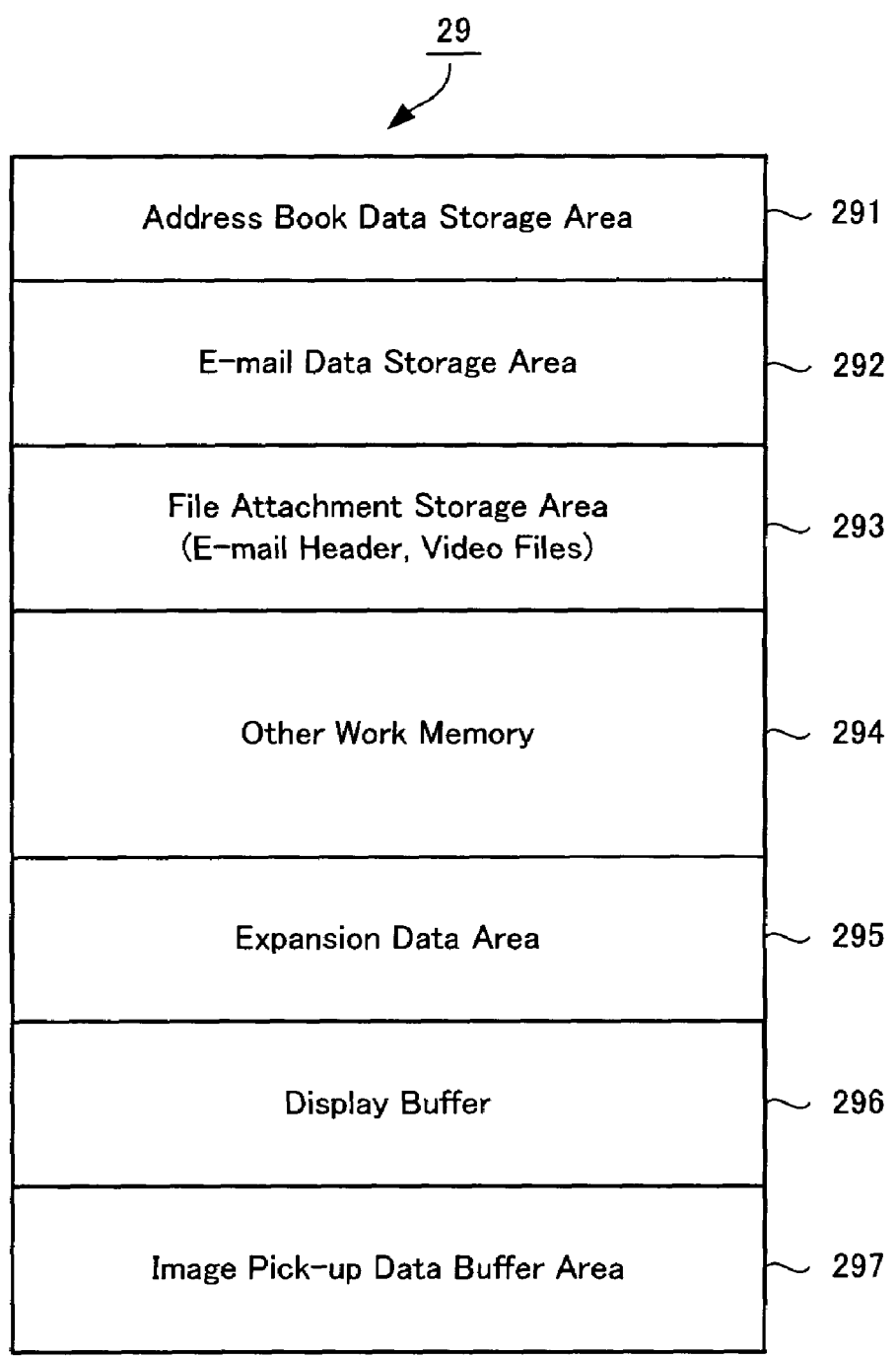
FIG. 9 is a conceptual diagram showing the composition of the RAM 29 memory area of the cellular phones 1*a* and 1*b*.

Subsequently, FIG. 9 is a conceptual diagram showing the memory area composition of the RAM 29 of the cellular phones 1a and 1b. The RAM 29 consists of an address book data storage area 291, an E-mail data storage area 292, a file attachment storage area 293 and an other work memory 294, an expansion data area 295, a display buffer 296 and the image pick-up data buffer area 297. The address book data storage area 291 stores two or more names, telephone numbers, E-mail addresses, etc. as a set of records. The E-mail data storage area 292 stores both outgoing E-mail data created using E-mail software and incoming E-mail data. The file attachment storage area 293 stores E-mail attachments (also referred to as inserted E-mail files), for instance the E-mail's header, video files, etc. In addition, the other work memory 294 is used for other work memory, for instance the above-mentioned decoding process in frame memory (three frames) or for storing various data. The expansion data area 295 stores the video data processed involving the expanded time-base sweep. The display buffer 296 is used as the buffer when displaying a video. The image pick-up data buffer area 297 is the storage area for buffering video while recording.

A-2 Operation of the Embodiments

The operation of the above-mentioned embodiments will now be described.

(1) Photography Mode

Figure 10:
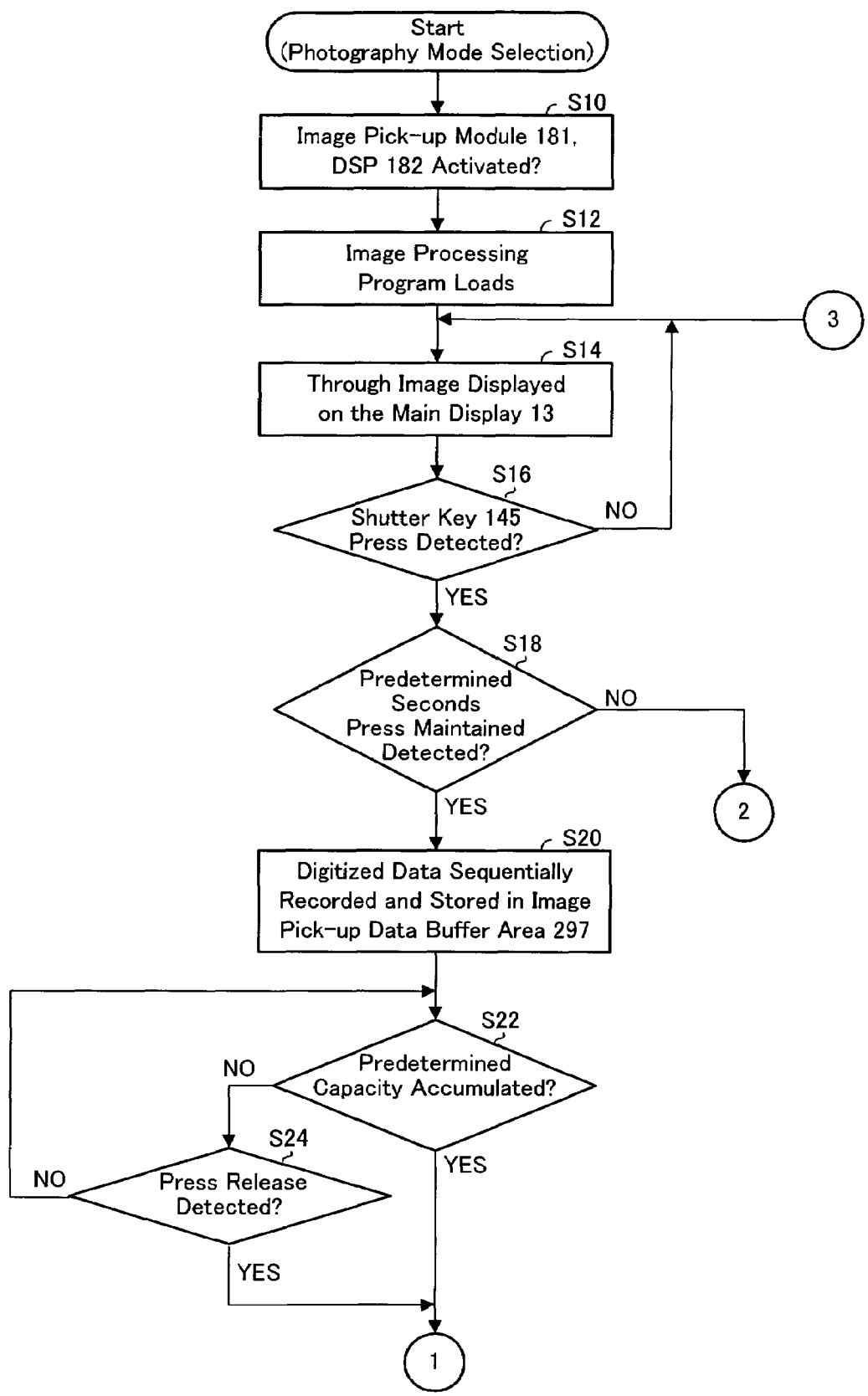
FIG. 10 is a flow chart for explaining operation of the image pick-up mode according to this embodiment.

In conjunction with FIGS. 10 and 11 flow charts, the operation of the image pick-up mode at the time of operation will be explained. Initially, the user's selection of the photography mode starts the image pick-up module 181 and the DSP 182 (Step S10). Next, the image processing program loads (Step S12), and displays the through (monitored) image on the main display 13 (Step S14). The operation then judges whether the shutter key 145 is pressed down (depressed) (Step S16). In cases where the shutter key 145 is not pressed down, the operation reverts to Step S14 and continues displaying the through image.

Figure 12:
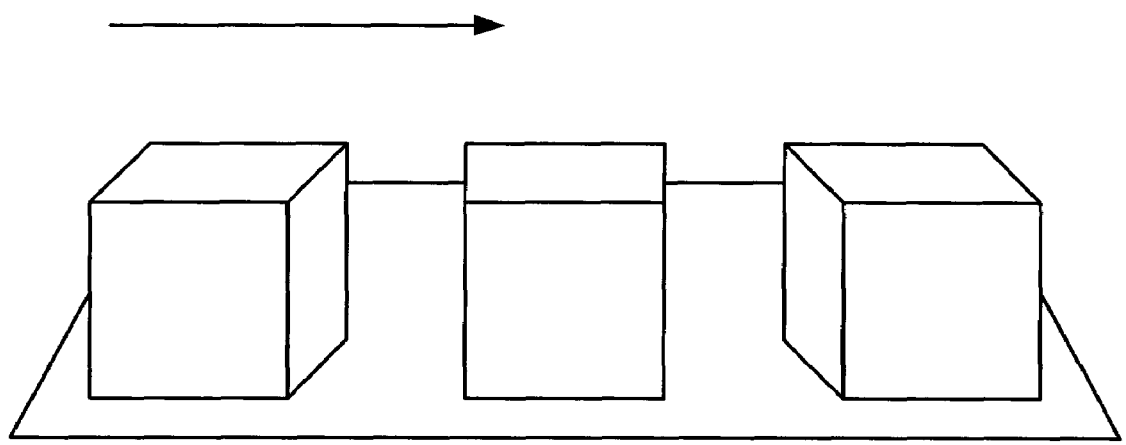
FIG. 12 is a mimetic diagram showing the appearance the photographic object digitized in the photography mode.

On the other hand, pressing down on the shutter key 145 is judged whether the pressing down is maintained or not for a predetermined number of seconds (two seconds or more) (Step S18). During the predetermined number of seconds, in cases where the shutter key 145 continues to be pressed down, the operation records (continuous shooting) sequences of digitized data, which is stored up in the image pick-up data buffer area 297 one after another (Step S20). Here, FIG. 12 is a mimetic diagram showing the appearance of a photographic object digitized in the photography mode. The example diagram shows the object moving in the direction of the arrow. In the shooting process of this digitized data, the operation judges whether the data of a predetermined capacity (for instance, 100K bytes) is stored (Step S22), and judges further whether the press down on the shutter key 145 has been released (Step S24). In cases where the digitized data has not reached the predetermined capacity and the press down on the shutter key 145 has not been released, the operation reverts to Step S22 and continues to store up digitized (video) data in the image pick-up data buffer area 297.

Figure 11:
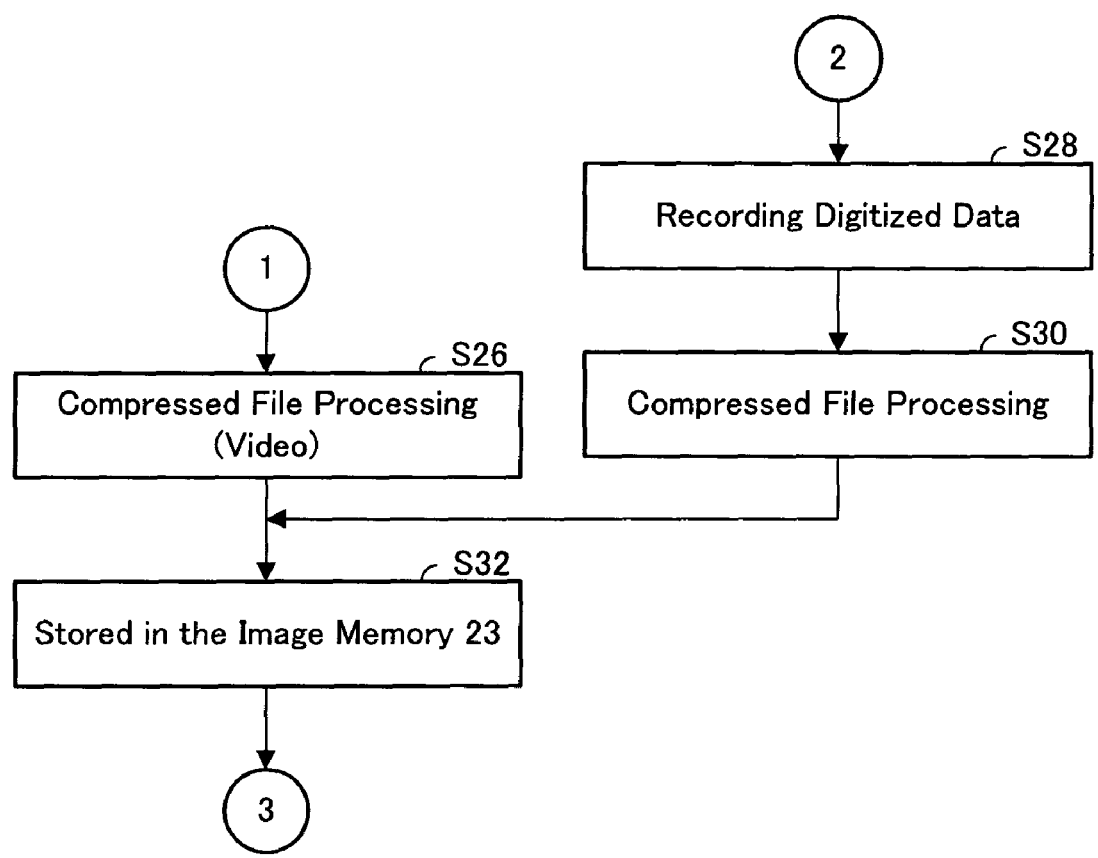
FIG. 11 is a flow chart for explaining operation of the image pick-up mode according to this embodiment.

Conversely, in cases where the data reaches the predetermined capacity or the press down on the shutter key 145 is released, the digitized data stored up in the image pick-up data buffer area 297 is processed into a compressed file (Step S26) as shown in FIG. 11. Subsequently, based on a time stamp, a filename is appended to the compressed file and the resultant video file is stored in the image memory 23 (Step S32). The operation then reverts to Step S14 and continues processing as mentioned above.

In Step S18, in cases where the shutter key 145 is not pressed down for a predetermined number of seconds (i.e., in cases where the shutter key 145 is depressed only for momentarily in essentially one motion (two or less seconds)), the operation starts recording (shooting) digitized data (Step S28). The stored up digitized data is then processed into a compressed file (Step S30). Afterwards, based on a time stamp, a filename is appended to the compressed file and the resultant still picture file is stored in the image memory 23 (Step S32). The operation then reverts to Step S14 and continues processing as mentioned above.

Accordingly, while using the photography mode, in cases where the press down/release operation of the shutter key 145 is detected within a predetermined time (two or less seconds), a still picture is captured by the image pick-up module 181 and processed into a compressed file at that time; in cases where the press down on the shutter key 145 is detected for more than a predetermined time (two or more seconds), from the press down starting point, video images are sequentially recorded and stored up in the image pick-up data buffer area 297; and the video recording will be terminated if the predetermined capacity (100K bytes) is exceeded or release of the shutter key 145 is detected.

(2) E-mail Creation Mode

The operation of the E-mail creation mode according to the present invention will now be described. FIGS. 13 through 16 are flow charts representing the sequence of operations for E-mail creation in the cellular phones 1a and 1b according to this embodiment. Initially, the user's selection of the E-mail creation mode displays an E-mail menu (Step S40). The operation judges whether "New" creation is selected from the E-mail menu (Step S42). Here, in cases where "New" creation is not selected, the operation judges whether the receiving "Inbox" (incoming E-mail) is selected (Step S44), and if not selected then advances to other processing (Step S46). In cases where the receiving (incoming) "Inbox" is chosen, the process for displaying received E-mail will be described in detail later on.

Meanwhile, the creation menu will be displayed if the new creation is selected from the E-mail menu (Step S48). Subsequently, the operation judges whether a "NO" to E-mail with video was selected from the E-mail menu (Step S50). When E-mail with video is not selected, the operation advances to the ordinary E-mail process (Step S52).

Conversely, in cases where E-mail with video is selected from the E-mail menu, load E-mail program with video and an image processing program (Step S54) and display a creation screen (Step S56).

Next, the operation judges which item of "Select Image," "E-mail Create—Edit", or "Sav—Close" is selected in the creation screen (Step S58). Here, as shown in FIG. 14, in cases where "Select Image" is selected, the operation first searches for video files (Step S60). Subsequently, the operation judges whether there are any video files available (Step S62). If there are no video files, an error message is displayed (Step S64), and then reverts to redisplay the creation screen in Step S56 shown in FIG. 13.

However, in cases where there is a video file, the operation displays the video file(s) (showing the initial still picture at the time of the image pick-up start) in an album (Step S66). Next, the operation judges whether one of video files is selected from the album display (Step S68). In cases where nothing is selected, the operation reverts to Step S66 and continues the album display.

On the other hand, if one of video files is singled out, the selected video file will resize in Sub-QCIF size (128×96 pixels) (Step S70), displayed as a still picture (Step S72), and then reverts to redisplay the creation screen in Step S56.

Figure 18:
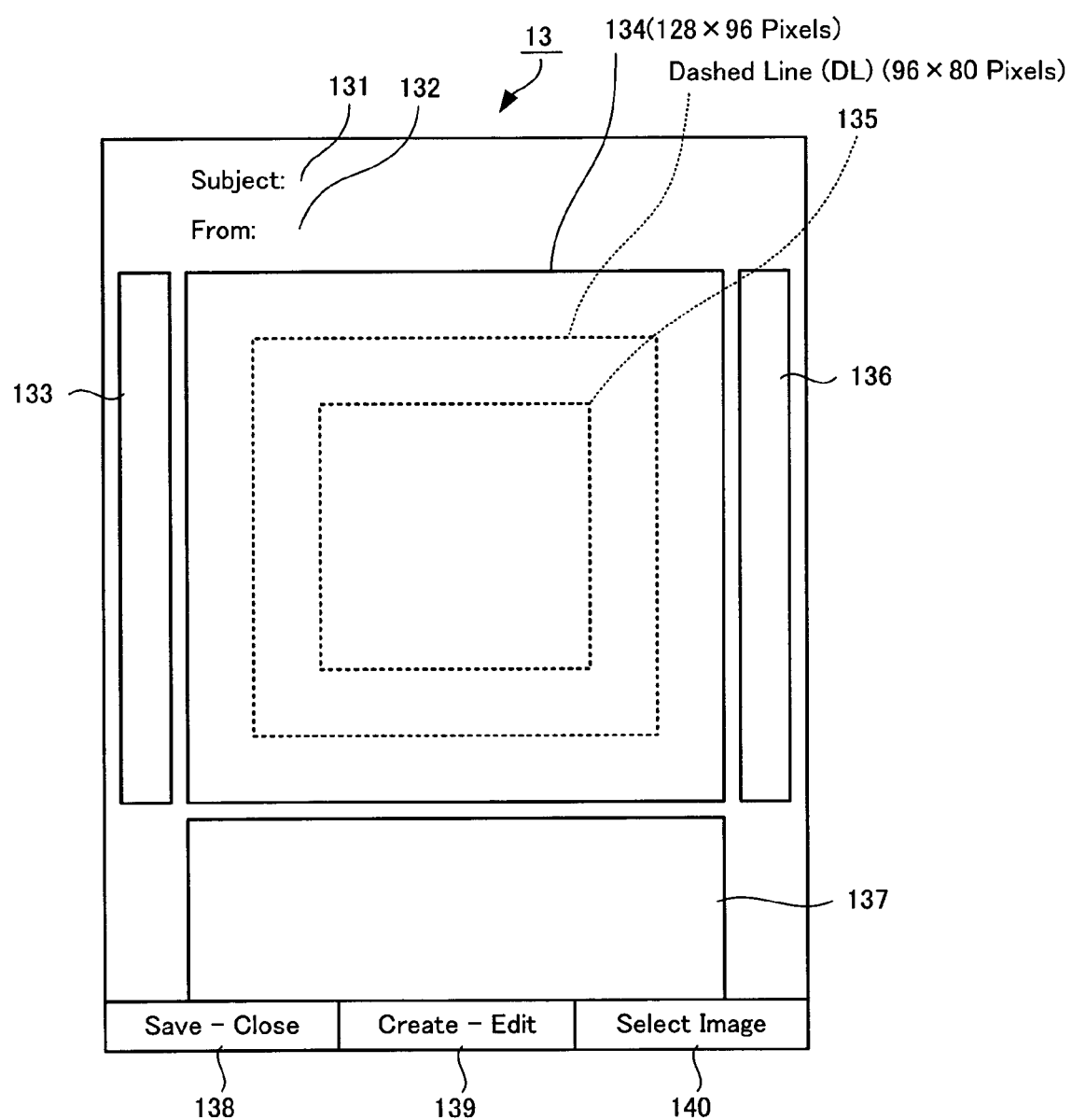
FIG. 18 is a mimetic diagram showing the display screen when "E-mail Create-Edit" is selected.

In the creation screen, in cases where "E-mail Create—Edit" is selected, the operation first displays a screen which performs each of the functions "Items—Edit—Display Screen" (Step S80). Here, FIG. 18 is a mimetic diagram showing the display screen when "E-mail Create—Edit" is selected. In the diagram, the subject of the E-mail message is displayed in a "Subject:" area 131. The E-mail sender's name (originator) is displayed in a "From:" area 132. The date and time of creation of the attached video file is displayed in a date display area 133. Available user-friendly options allow for changing the receiving time, current time, etc. with a predetermined keystroke.

A display area 134 is resized to 128×96 pixels (Sub-QCIF size) when streaming video contents and viewing a still picture. As described earlier in particular cases, this display area is where the video file scale expansion to the periphery occurs during playback or when the recording of a 96×80 pixel video file is paused (temporarily suspended) which produces a still picture. When a display area 135 plays back video to the display area 134, this area represents the center section which is not enlarged as the playback is set to scale=1×. A playback time gage 136 shows the time progress status of motion images being viewed at the time of video file playback. An E-mail text display area 137 serves as the area where the E-mail message body is displayed. In cases where lengthy text does not fit into this space, a scroll bar for scrolling and displaying the text is positioned at the right side.

A function key 138 is the key for operating "Save—Close." A function key 139 is the key for operating "Create—Edit." A function key 140 is the key for operating "Select Image." The above-mentioned function keys 138, 139 and 140 are equivalent to the E-mail key 141 as shown in FIG. 2 external view showing, the center key 145 (corresponds to the shutter key 145), and the function key 143 respectively. The function key 143 is also used for operating the "Playback"/"Pause" of video files.

Figure 19:
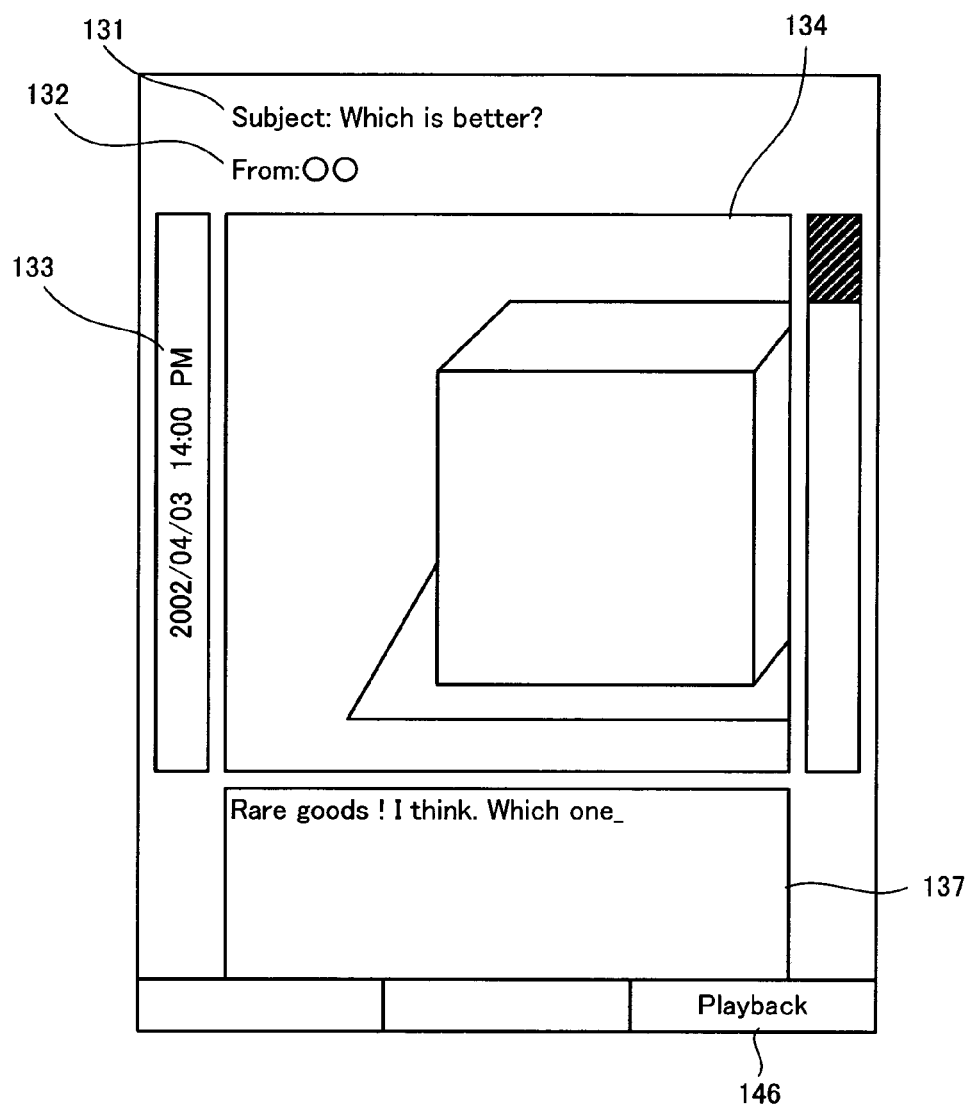
FIG. 19 is a mimetic diagram showing the display screen during "Pause" of a video during "Playback."

Next, FIG. 19 is a mimetic diagram showing an example of the above-mentioned display screen. The E-mail message "Subject:" with entered words "Which is nicer?" is displayed in the "Subject:" area 131. The E-mail sender's name "OO" is displayed in the "From:" area 132. The date and time of creation "2002/04/03 14:00 PM" of the attached video file is displayed in the date display area 133. Uniform scale expansion of the selected video (still picture) is performed and displayed in the display area 134 as a 128×96 pixel Sub-QCIF sized still picture. As for the E-mail text display area 137, an E-mail message text in preparation is displayed. A function key 146, which corresponds to the function key 143, used for operating the "Playback" of the video is displayed on the lowest line of the display screen.

Next, reverting to the explanation concerning operation, in the display screen shown in FIG. 19, the operation judges whether the function key 146 is operated (Step S82), and further judged whether a "decision" is detected (Step S84). In cases where operation of the function key 146 or a "decision" which operates "Playback" are not made, the operation reverts to Step S80 and continues the screen display of each of the functions "Items—Edit—Display Screen" shown in FIG. 15.

On the contrary, operation of the function key 146 (corresponding to the function key 143) used for operating the "Playback" judges video images is selected (Step S86). In cases where video images is selected, the operation performs an expanded time-base sweep of the 96×80-pixel video to 128×96 pixels, according to whichever of the expansion methods shown in FIGS. 6A through 6C, and repeatedly played back (Step S90).

Figure 17:
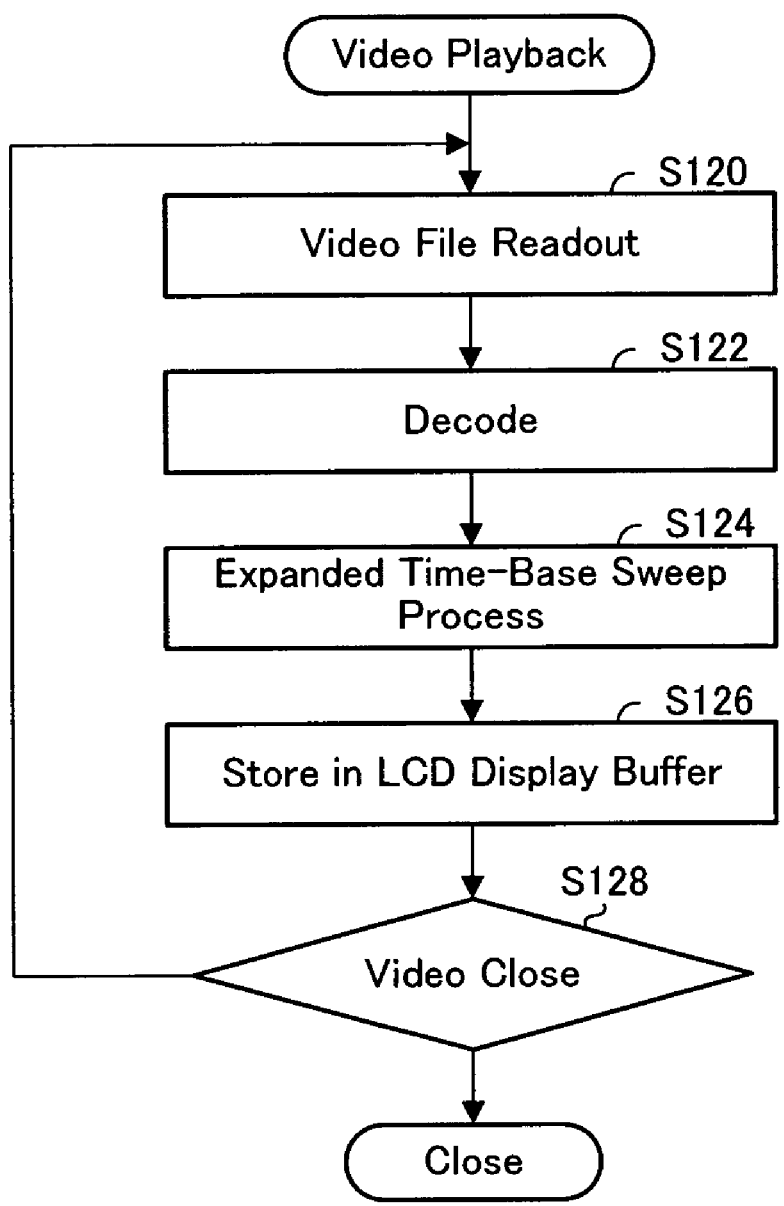
FIG. 17 is a flow chart for explaining operation when performing video expansion playback according to this embodiment.
Figure 20:
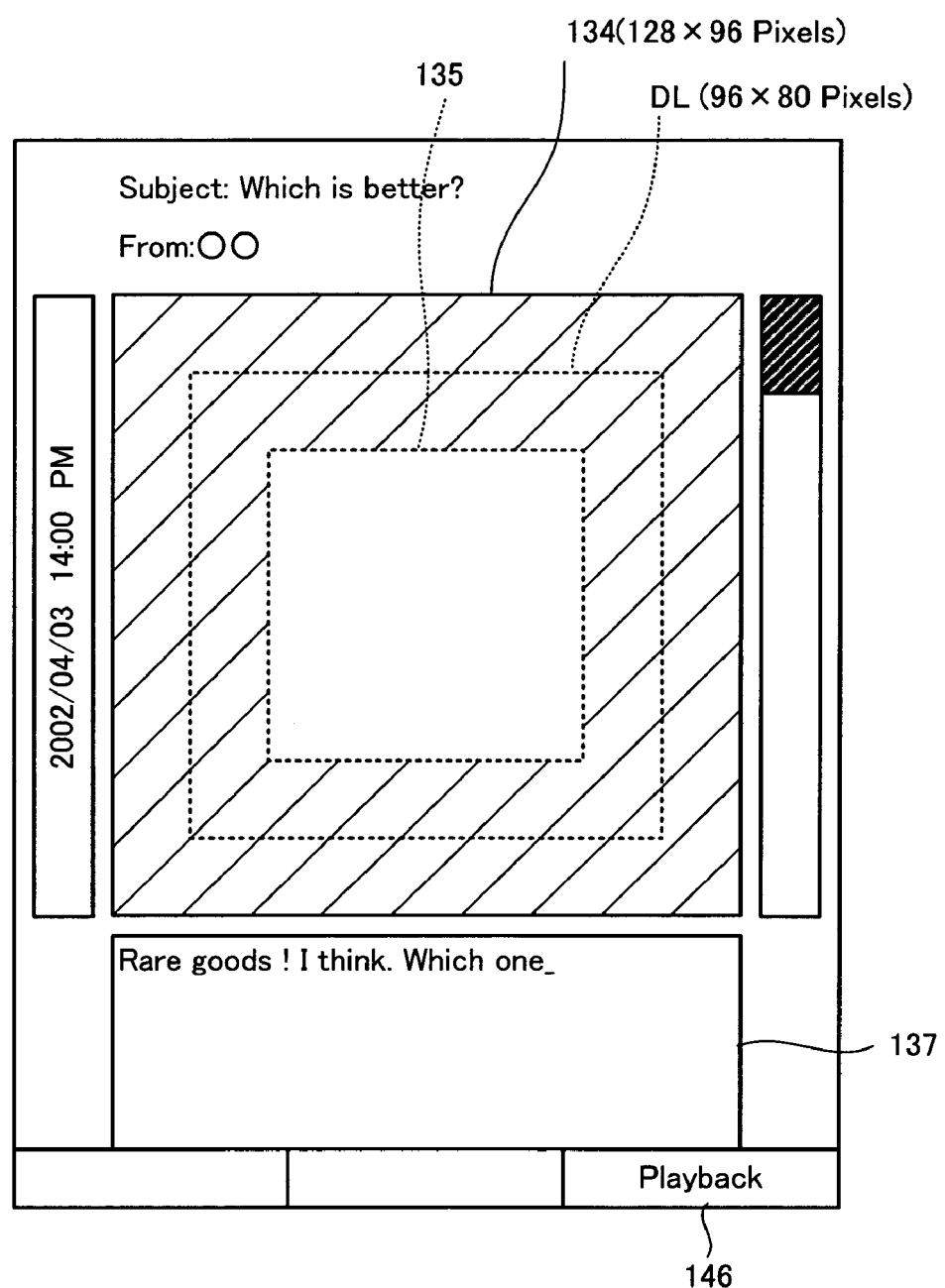
FIG. 20 is a mimetic diagram showing the display screen during video "Playback."

Here, FIG. 17 is a flow chart for explaining the operation at the time of carrying out expansion playback of the video. First, read selected video file (Step S120), decode (Step S122), and carry out an expanded time-base sweep process according to whichever of the expansion methods shown in FIGS. 6A through 6C (Step S124). The video which undergoes the expanded time-base sweep process stores in the display buffer 296 LCD (Step S126), and the operation judges whether the video is completed or not (Step S128). If a video is not completed, the operation reverts to Step S120 and operation mentioned above is repeated. That is, as shown in FIG. 20, the 96×80-pixel periphery shown with a dashed line and indicated with DL is enlarged (shadow area), and played back as a video which is 128×96 pixels. The playback is performed in the display area 135 without expanding the center section of the video. Meanwhile, processing will end if the video is completed.

Figure 21A:
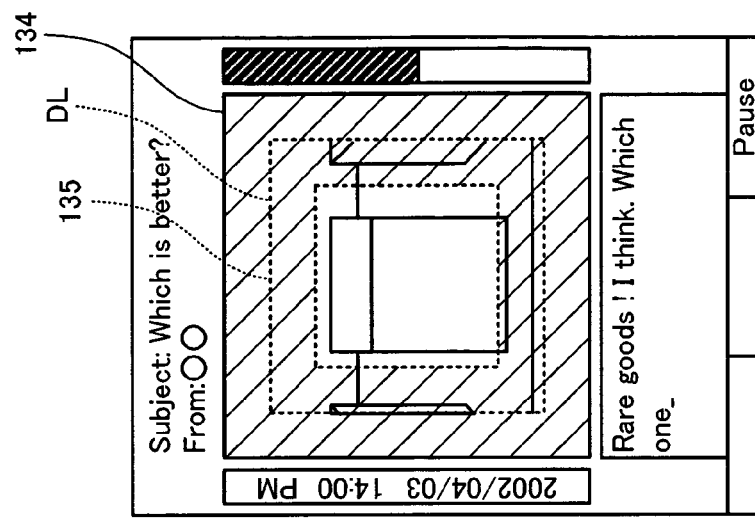
FIG. 21 is a mimetic diagram showing an example of the display screen when performing "Playback" in the E-mail creation mode of a video file object digitized in the image pick-up direction as shown in FIG. 12 in the above-mentioned photography mode.
Figure 21B:
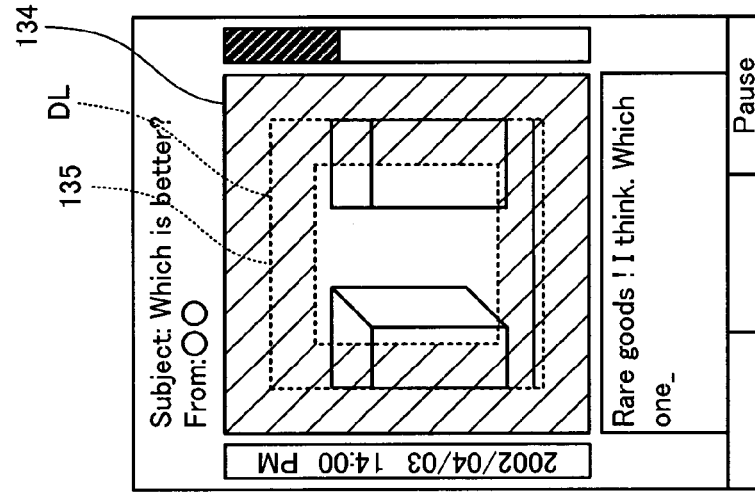
Figure 21C:
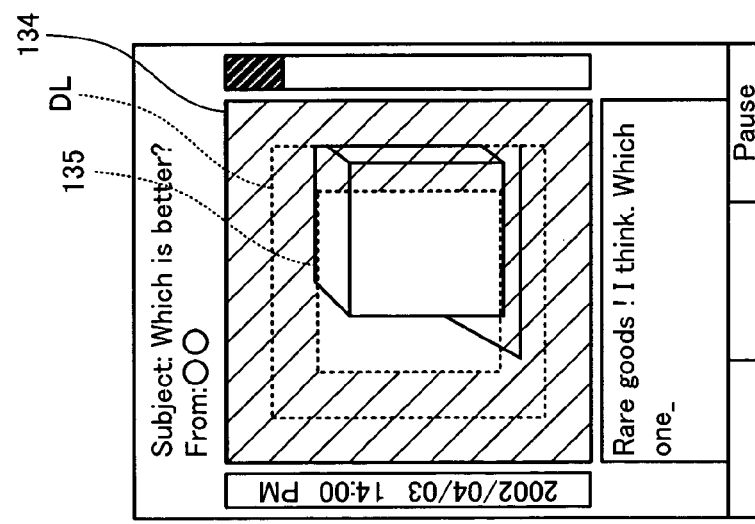

Here, FIGS. 21A through 21C are mimetic diagrams showing examples of the display screen in reference to the video file object digitized in the image pick-up direction shown in FIG. 12 in the above-mentioned photography mode, and in the case where playback is performed in the E-mail creation mode. An expanded time-base sweep of the periphery is performed to the display area 134 in the order shown in FIGS. 21A through 21C (shadow area), and playback of the video is resized to 128×96 pixels. A function key 147 (correspond to the function key 143) for operating "Pause" displayed on the lowest line of the display screen during playback.

The operation continues repeat playback of the video images of Step S90 until it judges whether the function key 147 (corresponding to the function key 143) for operating "Pause" is pressed (Step S92) and the function key 147 is pressed during this playback.

Figure 22:
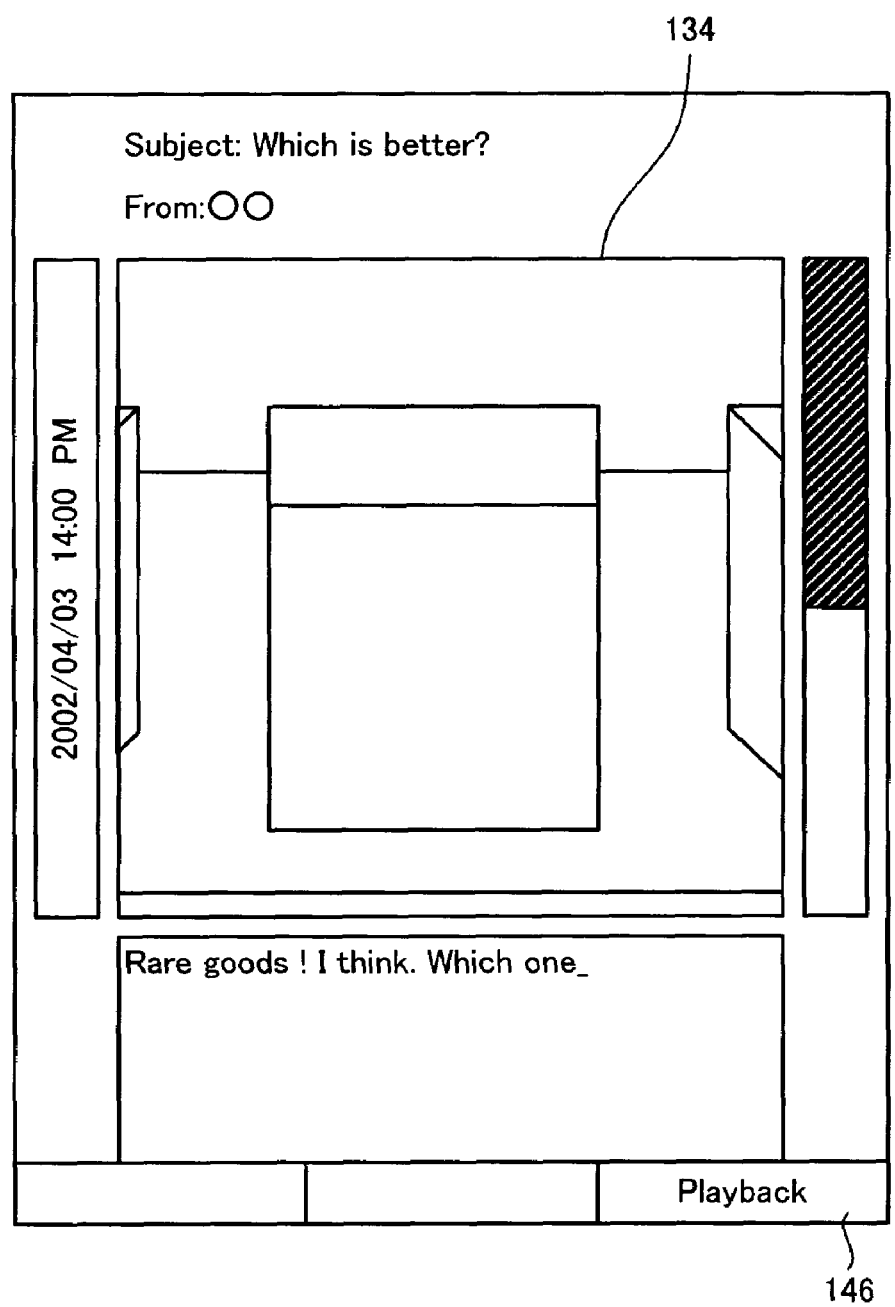
FIG. 22 is a mimetic diagram showing the display screen during "Pause" of a video during playback.

In the meantime, if the function key 147 (corresponding to the function key 143) is pressed during playback of the video images, the operation will pause (Step S94). During "Pause" as shown in FIG. 22, a resized still picture at that instant in Sub-QCIF size (128×96 pixels) (uniform scale expansion) is shown and maintained in the display. The example illustrated in FIG. 22 represents the display at the time of pause in the state of the display shown in FIG. 21C mentioned above. Subsequently, the operation reverts to Step S80 and the processing stated above is repeated. Thus, in this embodiment, even when creating or editing an E-mail message text, a video file can be repeatedly played/paused easily. Moreover, the E-mail text and the video can be displayed on one screen.

At Step S80, when each of the functions "Items—Edit—Display Screen" are displayed, in cases where the function key is operated in the state where video images is not selected, the operation will display a message "A video has not been select d." (Step S96). Next, the operation judges whether the predetermined time expiration has occurred (Step S98). If the predetermined time expiration has not timed out, the operation reverts to Step S96 and maintains the display of the above-mentioned message. Next, the operation judges whether the predetermined time expiration has occurred (Step S98). If the predetermined time expiration has not timed out, the operation reverts to Step S96 and maintains the display of the above-mentioned message.

Conversely, in cases where the display of the above-mentioned message exceeds the predetermined time expiration, the message is eliminated (Step S100). Then, the operation reverts to Step S80 and the processing described above is repeated.

Figure 13:
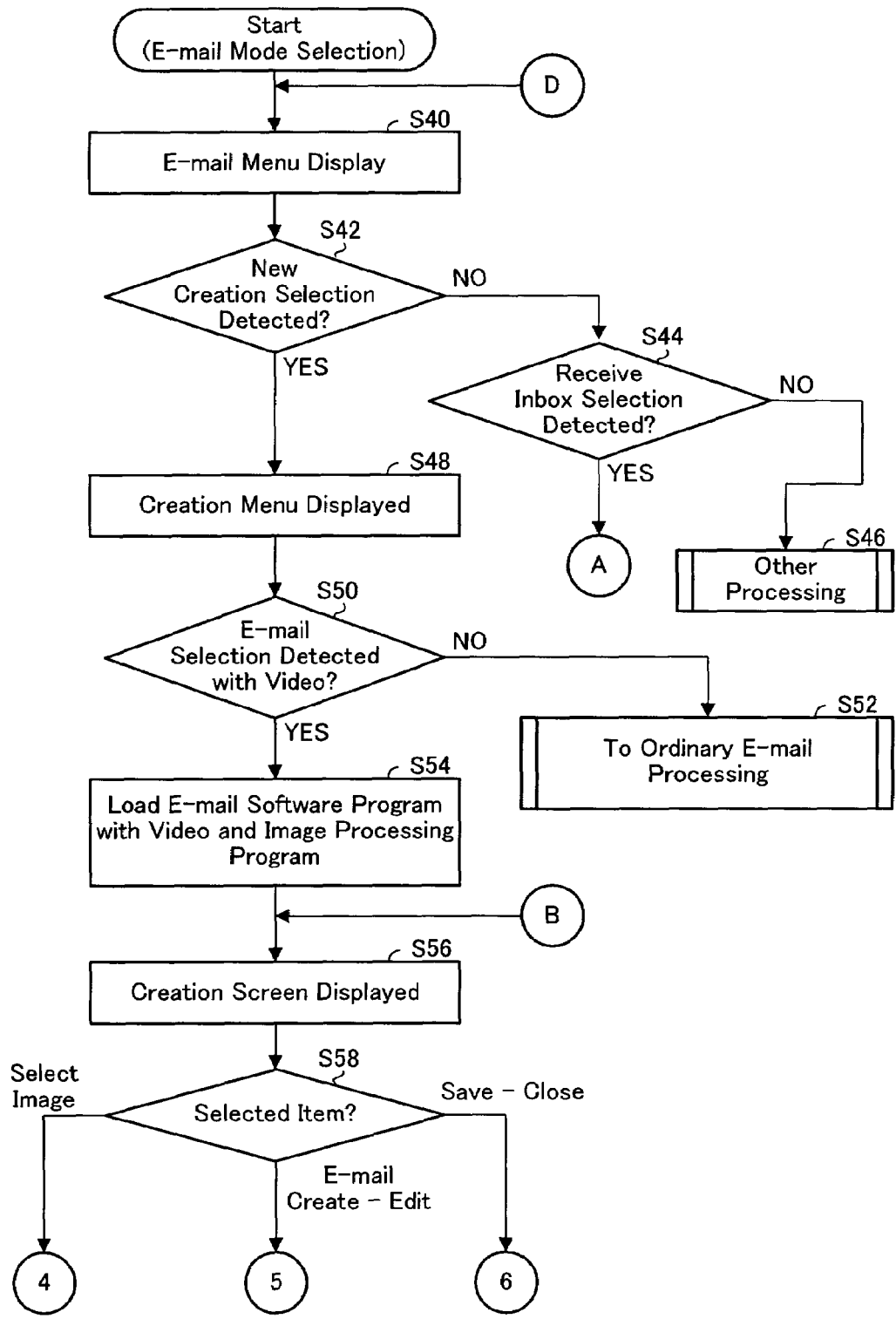
FIG. 13 is a flow chart for explaining operation of the E-mail creation mode of the cellular phones 1*a* and 1*b* according to this embodiment.
Figure 14:
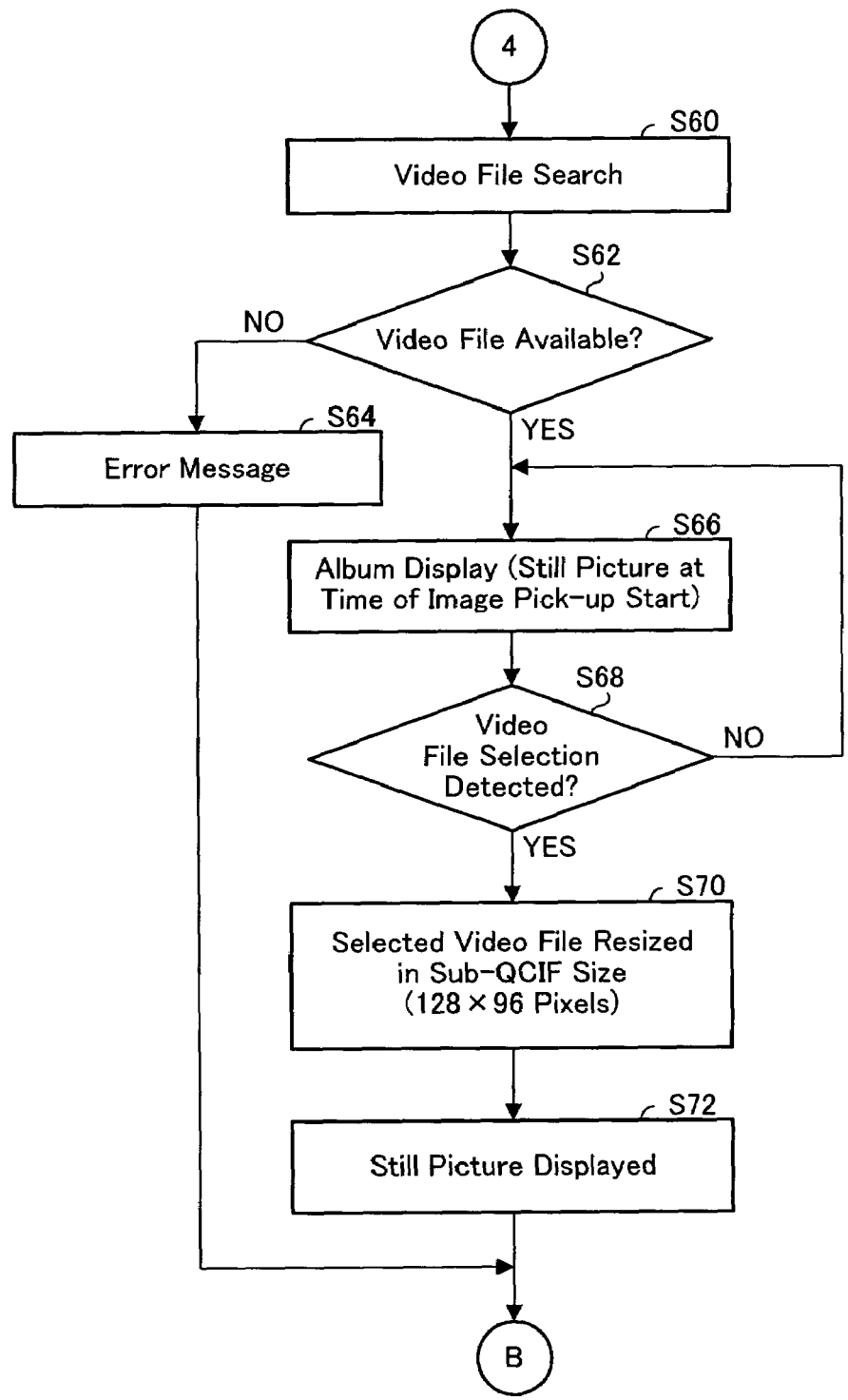
FIG. 14 is a flow chart for explaining operation of the E-mail creation mode of the cellular phones 1*a* and 1*b* according to this embodiment.
Figure 15:
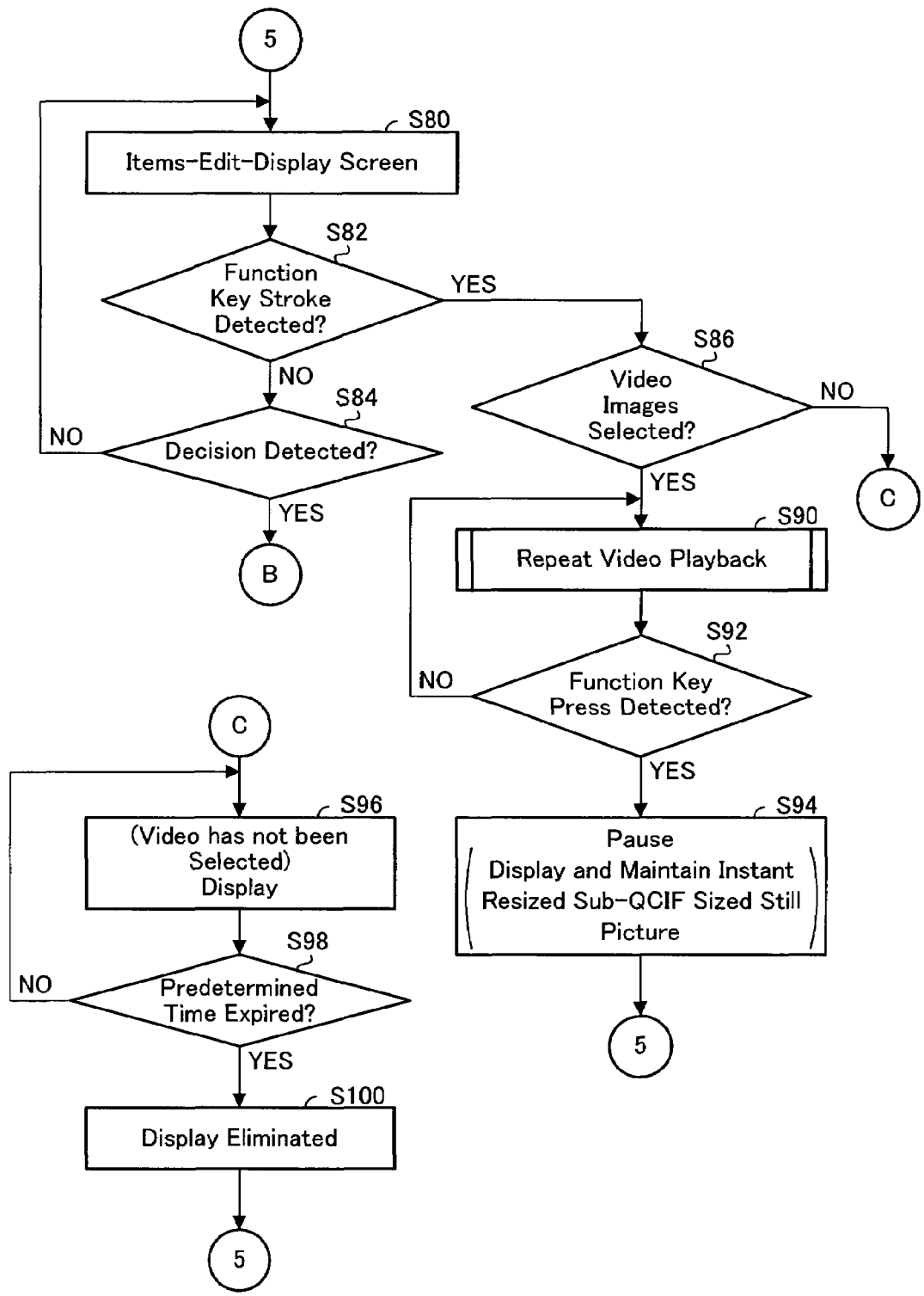
FIG. 15 is a flow chart for explaining operation of the E-mail creation mode of the cellular phones 1*a* and 1*b* according to this embodiment.

Furthermore, if a "decision" is detected at Step S80 when each of the functions "Items—Edit—Display Screen" are displayed, the operation reverts to display the creation screen of Step S56 shown in FIG. 13, and the processing mentioned above will be repeated.

Figure 16:
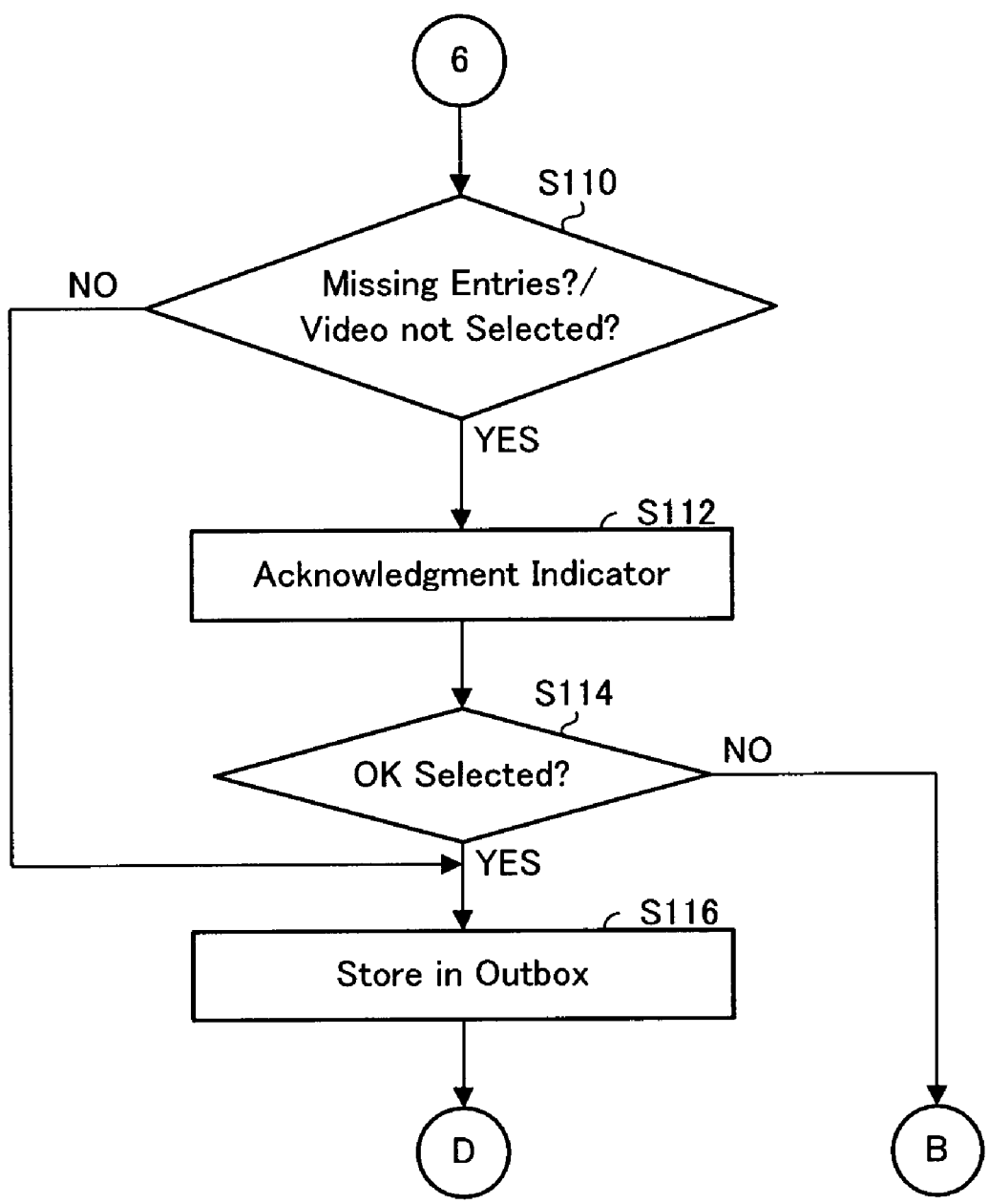
FIG. 16 is a flow chart for explaining operation of the E-mail creation mode of the cellular phones 1*a* and 1*b* according to this embodiment.

At the E-mail creation screen in Step S56, in cases where "Save—Close" is selected, the operation first judges whether there are any missing (blank) entries or a video file is not selected (Step S110) as shown in FIG. 16. And in cases where there is a missing entry or a video file is not selected, the operation provides an acknowledgment indicator to the user (Step S112), and judges whether "OK" is selected or not (Step S114). In cases where "OK" is not selected (i.e., in cases where there is a missing entry item or a video file is not selected), the operation reverts to Step S56 shown in FIG. 13 and redisplays the E-mail creation screen. Henceforth, the user selects an input or video file to correct the missing entry, and completes the E-mail message.

Meanwhile, in some cases there may be a missing entry in the acknowledgment indicator to the user where "OK" is selected, as a video file does not need to be selected, the operation then stores the E-mail concerned in the sender's "Outbox" (outgoing E-mail box) (Step S116). The operation again reverts to display the E-mail menu in Step S40 and the processing mentioned above is repeated. Besides, in cases where there is no missing entry or a video is selected, the operation stores the E-mail concerned in the sender's "Outbox" (Step S116), and it reverts to a display of an E-mail menu in Step S40 and the processing mentioned above is repeated. The E-mail with a video is stored in the "Outbox" and is transmitted according to predetermined timing.

(3) Checking Received E-Mail

Figure 23:
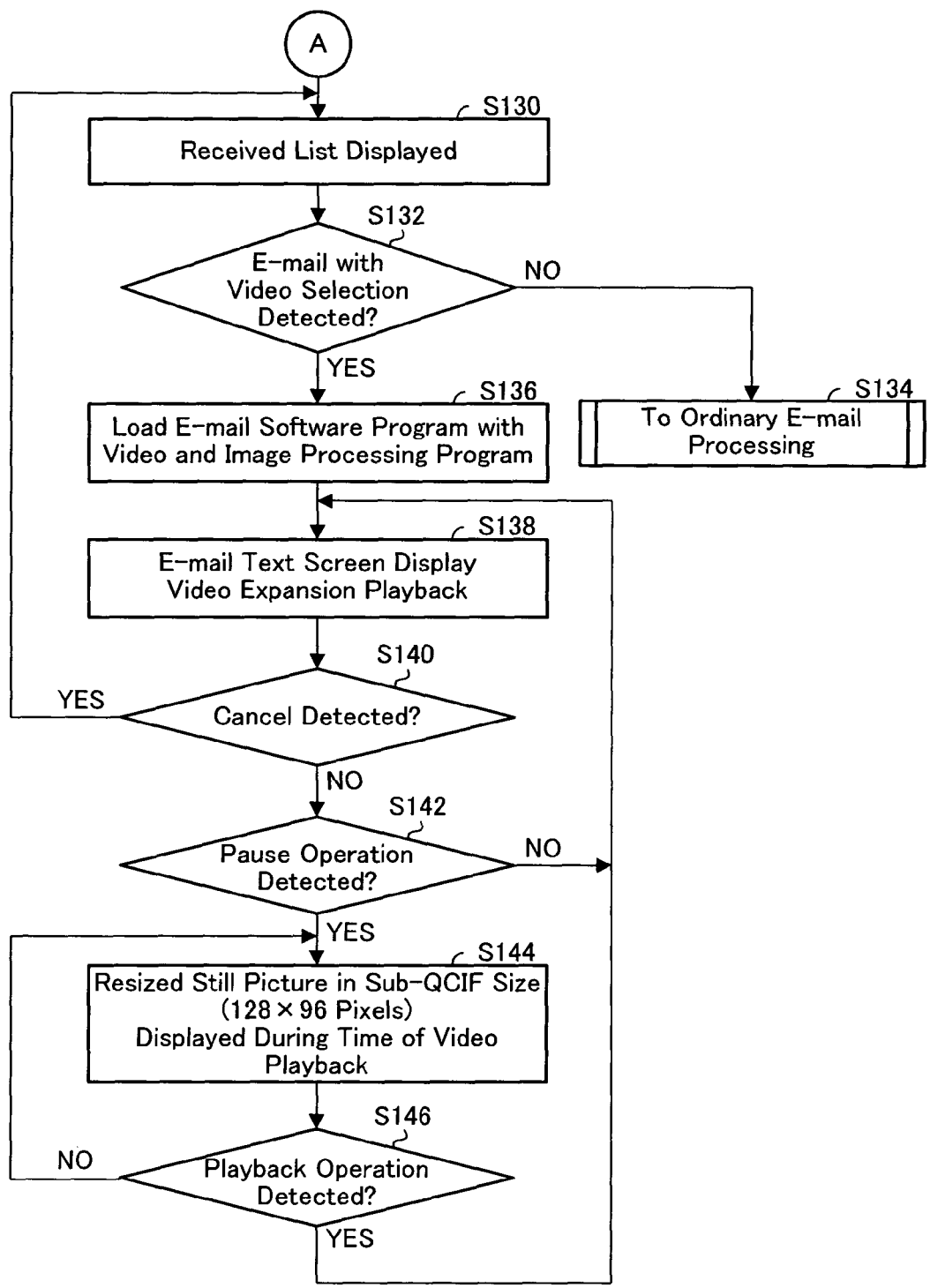
FIG. 23 is a flow chart for explaining operation for explaining the operation at the time of checking received E-mail of cellular phones 1*a* and 1*b* according to this embodiment.
Figure 25A:
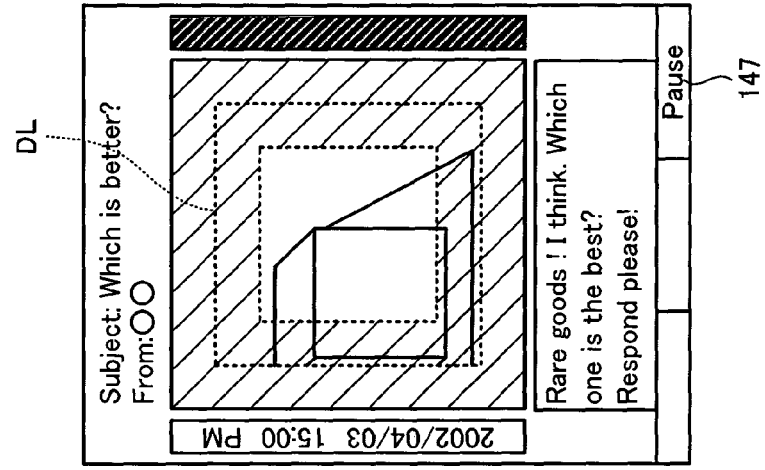
FIG. 25 is a mimetic diagram showing an example of the display screen while playing back the video of a received E-mail with a video attachment.
Figure 25B:
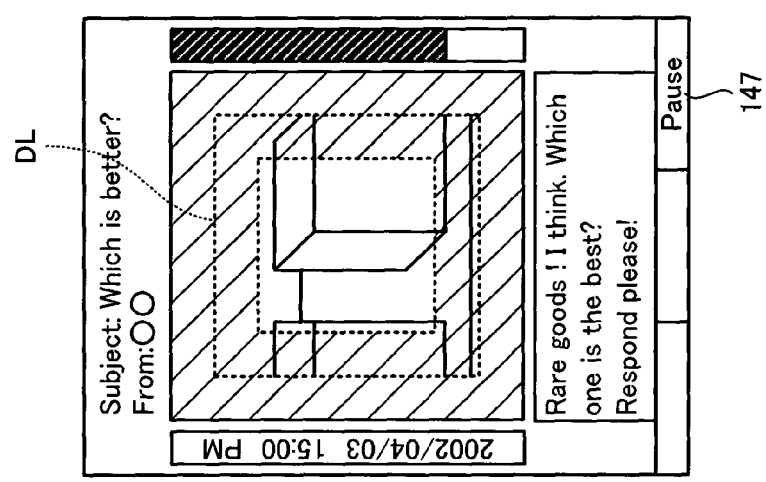

The operation of checking received (incoming) E-mail according the present invention will now be described. Here, this embodiment describes a case where an E-mail message with a video attachment is received in cellular phone 1b which was originally created in the same manner explained above in cellular phone 1a. However, since there are no changes relating to the receiving of E-mail with video, these well-known E-mail processing details have been omitted. FIG. 23 is a flow chart for explaining the operation at the time of checking received E-mail. In reference in FIG. 13 at E-mail creation time, in Step S44 the received E-mail check processing is performed when the received E-mail "Inbox" is selected.

Selection of the received E-mail function first displays a list of received E-mails stored in the "Inbox" (Step S130). Next, the operation judges whether or not an E-mail with video is selected (Step S132), and in cases where an ordinary E-mail is selected, the operation then switches to ordinary E-mail processing (Step S134).

On the contrary, if E-mail with video is selected, the operation at the same time loads an E-mail software program with video and an image processing program (Step S136). While displaying the E-mail text utilizing the process mentioned above, the operation enlarges the video periphery and performs video playback in 128×96 pixels (Step S138). Here, FIGS. 24A through 24C and FIGS. 25A and 25B are mimetic diagrams showing examples of the display screen while playing back the video of a received E-mail with video. The playback of the video shows the expanded time-base sweep performed in the sequential order of FIGS. 24A, 24B, 24C, 25A and 25B to the display area 135 in 128×96 pixels. The function key 147 (corresponding to the function key 143) to "Pause" the video is displayed on the lowest line of the display screen during playback.

The operation judges whether a cancel is detected during the display of received E-mail (Step S140). If cancel is detected, the operation reverts to the received list display of Step S130 and the processing mentioned above will be repeated. In the meantime, if cancel is not detected, the operation judges whether the function key 147 (equivalent to the function key 143) to "Pause" (temporarily suspend) the video playback is operated (Step S142). If the function key 147 for "Pause" is not operated, the operation reverts to Step S138 and continues to display of the E-mail text and video playback.

Figure 26:
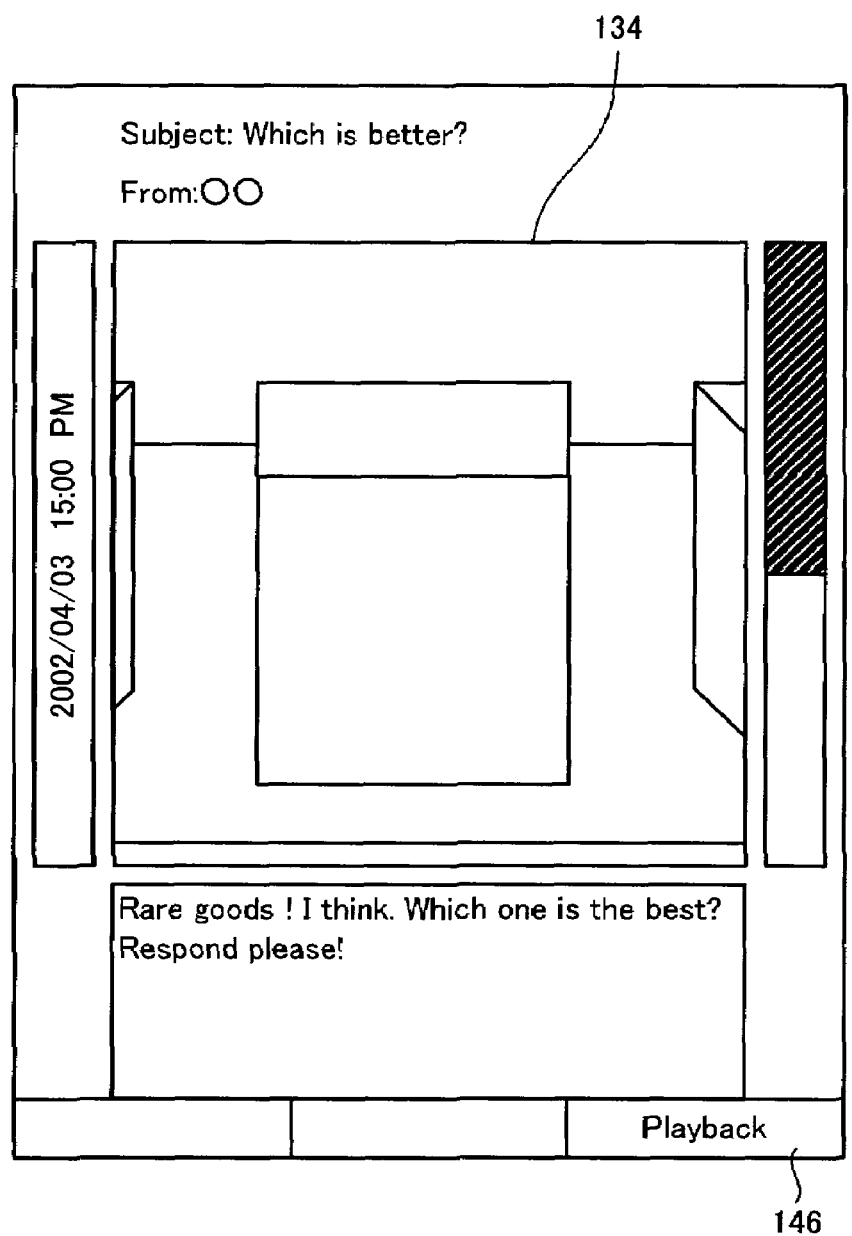
FIG. 26 is a mimetic diagram showing the display screen during "Pause" of a video during playback.

Conversely, during video playback if operation of the function key 147 (equivalent to the function key 143) for "Pause" is detected, a still picture is displayed resized to 128×96 pixels (Sub-QCIF size) from which uniform scale expansion was performed, as shown in FIG. 26 (Step S144). Next, the operation judges whether the function key 146 (equivalent to a function key 143) for playing back is operated (Step S146). If "Playback" is not operated, the operation reverts to Step S144 and continues a "Pause" state. If the function key 146 for "Playback" is operated in the meantime, while reverting to Step S138 and displaying the E-mail text, the operation resizes from the still picture instantly to a video by which an expanded time-base sweep is performed to 128×96 pixels, carrying out playback, and the processing mentioned above is repeated.

In addition, in the above-mentioned embodiment, a flag may be appended to the video file which performs the expanded time-base sweep during playback. Pertaining to a cellular phone which receives an E-mail with video, in cases where the above-mentioned flag is appended to the E-mail with video, the enlarged video periphery as a result of the predetermined expansion method (or in cases where expansion playback is operated) performs playback in 128×96 pixels. Conversely, in cases where the above-mentioned flag is not appended, the expanded time-base sweep does not occur (or in cases where expansion playback is not being operated) and performs playback in 96×80 pixels.

Moreover, in the above-mentioned embodiment, when playing back a video the user can also assign the function which operates the expanded time-base sweep to whichever key desired (e.g. a shortcut key). In this case, if the above-mentioned key is pressed regardless of the existence of a flag, the video periphery will be enlarged by the predetermined expansion method and made to carry out a playback by 128×96 pixels. Furthermore, the user may rotate (cycle through) the expansion methods shown in FIGS. 6A, 6B and 6C whenever the above-mentioned assigned key is pressed.

In addition, the user can attach an author's copyright flag (right of authorship) to the video file header and thereby limit the unauthorized transfer of the video file.

Although the details of a cellular phone with a digital camera (image pick-up function) have been described, if the device is a data communications device which can display video, this invention can be applied in several forms and must not be construed to limit this invention.

While the present invention has been described with reference to the preferred embodiments, it is our intention that the invention be not limited by any of the details of the description thereof.

As this invention may be embodied in several forms without departing from the spirit of the essential characteristics thereof, the present embodiments are therefore illustrative and not restrictive, since the scope of the invention is defined by the appended claims rather than by the description preceding them, and all changes that fall within meets and bounds of the claims, or equivalence of such meets and bounds thereof are intended to be embraced by the claims.

What is claimed is:

1. A cellular phone with a digital camera comprising:
   a memory for storing video received by E-mail attachment;
   a display device for displaying still pictures and video; and
   a display controller for controlling said display device to read out received video stored by said memory, to enlarge a video periphery by a different ratio from a center section, and to perform video playback in a still picture display practicable area size of said display device.

2. A cellular phone with a digital camera comprising:
   a shutter key;
   a still picture image pick-up means for recording still pictures when said shutter key is operated less than predetermined time;
   a video image pick-up means for recording video when said shutter key is operated more than predetermined time;
   a storage means for storing said recorded still pictures or video;
   an E-mail transceiver means for transmitting said still pictures or video stored in said storage means by E-mail attachment, and for receiving still pictures or video by E-mail attachment;
   a still picture display means for displaying still pictures stored in said storage means; and
   a video display means for displaying video stored in said storage means,
   wherein said video display means enlarges a periphery of video by a different ratio from a center section and performs video playback in a display size of a still picture.

3. The data communications device comprising:
   a receiving means for receiving still pictures and video;
   an image pick-up means for recording still pictures and video;
   a storage means for storing said still pictures and video recorded by said image pick-up means, or said still pictures or video received by said receiving means;
   a display means for displaying still pictures or video stored in said storage means;

a video playback means for selecting video stored in said storage means, for enlarging a video periphery of said selected video and for performing continuous playback in a display size of said still picture;

a pause direction means for directing to suspend playback of the video; and a display control means for controlling said display means to suspend playback of the video, to enlarge a still picture at that instant uniformly, and to display on said display means when there are pause directions from said pause direction means.

* * * * *